United States Patent
Okazaki et al.

(10) Patent No.: US 8,679,379 B2
(45) Date of Patent: Mar. 25, 2014

(54) METHOD FOR PRODUCING MOLDED BODY OR WAFER LENS

(75) Inventors: Naoko Okazaki, Tokyo (JP); Shigeru Hosoe, Hachioji (JP); Masashi Saito, Koganei (JP)

(73) Assignee: Konica Minolta Opto, Inc., Tokyo (JP)

( * ) Notice: Subject to any disclaimer, the term of this patent is extended or adjusted under 35 U.S.C. 154(b) by 411 days.

(21) Appl. No.: 12/933,082

(22) PCT Filed: Mar. 12, 2009

(86) PCT No.: PCT/JP2009/054749
§ 371 (c)(1),
(2), (4) Date: Sep. 16, 2010

(87) PCT Pub. No.: WO2009/116448
PCT Pub. Date: Sep. 24, 2009

(65) Prior Publication Data
US 2011/0042840 A1 Feb. 24, 2011

(30) Foreign Application Priority Data
Mar. 19, 2008 (JP) ................................. 2008-072045

(51) Int. Cl.
*B29D 11/00* (2006.01)
(52) U.S. Cl.
USPC ............................. 264/1.36; 264/1.7; 264/2.5
(58) Field of Classification Search
USPC .................. 264/1.36, 1.38, 1.7, 2.5; 425/808
See application file for complete search history.

(56) References Cited

U.S. PATENT DOCUMENTS

| 6,366,406 | B1 | 4/2002 | Hamanaka | |
|---|---|---|---|---|
| 7,070,862 | B1 | 7/2006 | Miyakawa | |
| 2002/0158354 | A1* | 10/2002 | Foreman et al. | 264/1.38 |
| 2005/0093186 | A1* | 5/2005 | Nystrom et al. | 264/1.36 |
| 2006/0204901 | A1 | 9/2006 | Shimizu | |

FOREIGN PATENT DOCUMENTS

| CN | 1562622 | 1/2005 |
|---|---|---|
| CN | 1773328 | 5/2006 |
| CN | 101097263 | 1/2008 |
| JP | 2-24127 | 1/1990 |

(Continued)

OTHER PUBLICATIONS

Written Opinion issued on May 25, 2012 in the corresponding Singapore Patent Application No. 2010-06494-7.

(Continued)

*Primary Examiner* — Mathieu D. Vargot
(74) *Attorney, Agent, or Firm* — Cozen O'Connor

(57) ABSTRACT

The present invention aims to improve shape precision of a molded body when a plurality of molded bodies, which are projections or recesses made of a curable resin, are formed on both sides of a glass substrate. Disclosed is a method for producing a molded body, which comprises a step of preparing a first mold having a plurality of negative molding surfaces having shapes corresponding to a plurality of molding parts; a step of applying a curable resin onto a surface of the first mold on which the molding surfaces are formed; and a curing step of curing the applied curable resin. The curing step includes a photocuring step wherein curing of the curable resin is carried out by irradiating the resin with light, and a heat curing step wherein the curable resin partly cured by the photocuring step is further cured by being subjected to a heat treatment.

10 Claims, 10 Drawing Sheets

(56) References Cited

FOREIGN PATENT DOCUMENTS

| | | |
|---|---|---|
| JP | 8-252829 | 10/1996 |
| JP | 8-258171 | 10/1996 |
| JP | 10-323839 | 12/1998 |
| JP | 2002-86463 | 3/2002 |
| JP | 2005-41164 | 2/2005 |
| JP | 2006-106229 | 4/2006 |
| JP | 2009-222732 | 10/2009 |

OTHER PUBLICATIONS

Office Action (dated Sep. 25, 2013) from European Patent Office in corresponding European Patent Office Application No. 09722536.

* cited by examiner

US 8,679,379 B2

METHOD FOR PRODUCING MOLDED BODY OR WAFER LENS

This is a U.S. National Phase under 35 U.S.C. §371 of International Application No. PCT/JP2009/054749, filed on Mar. 12, 2009, and claims priority on Japanese application No. 2008-072045, filed on Mar. 19, 2008, the entire content of which is hereby incorporated by reference.

TECHNICAL FIELD

The present invention relates to the producing method of a wafer lens.

BACKGROUND ART

Conventionally, in the manufacturing field of an optical lens, a technique has been studied such that a lens section (optical member) made of a hardening resin such as a thermo-hardening resin is provided on a glass flat plate, whereby an optical lens with high heat resistance is obtained (for example, refer to Patent Document 1).

Further, as a producing method of an optical lens with the application of the above technique, a method is developed such that a plurality of optical members made of a hardening resin are formed on a glass flat plate so as to form a so-called "wafer lens" so that a plurality of lenses are formed simultaneously on an integrated condition and the glass flat plate is cut out after the molding. According to this producing method, the producing cost of an optical lens can be reduced.

Patent document 1: Japanese Patent No. 3926380

DISCLOSURE OF THE INVENTION

Problems to be Solved by the Invention

However, since a molding and producing method is not described concretely in Patent document 1, an optical lens cannot actually be produced.

In this regard, in order to fabricate an optical lens in which a lens section is provided on both surfaces of a glass flat plate, if a lens section is simply provided sequentially on one surface and then on another surface, a glass base board warps due to the hardening and shrinking of the resin on the one surface (surface provided the lens section in first). Accordingly, the shape accuracy of the lens section provided later on the another surface becomes low and its performance becomes deteriorated. Further, if the warp of the glass base board is too large, since the glass base board may be broken, it becomes impossible to conduct molding. Further, in the case where the glass base board is made in a large size such that a lot of lens sections are formed on it at one time efficiently, these problems becomes remarkable.

The main object of the present invention is to provide a production method of a wafer lens with which in the case where optical members are provided on both sides of a base board, the shape accuracy of the optical members can be improved.

Means for Solving the Problems

According to one embodiment of the present invention, in a production method of a molding member in which a configuration corresponding to a plurality of molding sections made of a hardening resin with a form of convex or concave is formed on a surface of a glass base board, a production method of a molding member is provided so as to characterize by comprising:

a process of preparing a first mold having a plurality of molding surfaces with a negative configuration corresponding to the plurality of molding sections;

a process of coating a hardening resin on a surface of the first mold on which the plurality of molding surfaces are formed; and a process of hardening to advance hardening of the coated hardening resin, wherein the hardening process includes a light hardening process to advance hardening by irradiating light to the hardening resin and a heat hardening process to conduct a heating process to the hardening resin whose hardening has been advanced by the light hardening process so as to advance further the hardening of the hardening resin.

In this production method of a molding member, it is preferable that after the hardening of the hardening resin is advanced at a first temperature in the heat hardening process, the hardening of the hardening resin is further advanced at a second temperature higher than the first temperature.

Further, in this production method of a molding member, it is preferable that the first temperature is in a range of 70 to 90° C. and the second temperature is in a range of 100 to 250° C.

According to another embodiment of the present invention, in a production method of a wafer lens in which optical members made of a hardening resin are provided on both surfaces of a base board, a production method of a wafer lens is provided so as to characterize by comprising:

a process of forming a first duplication molding section made of a second hardening resin and having a plurality of molding surfaces with a negative configuration corresponding to an optical surface configuration from a first mold having a plurality of molding surfaces with a positive configuration corresponding to the optical surface of the optical member provided on one surface of the base board and further lining the first duplication molding section with a base board for the first duplication molding section, thereby forming a first duplication mold;

a process of fanning a second duplication molding section made of the second hardening resin and having a plurality of molding surfaces with a negative configuration corresponding to an optical surface configuration from a second mold having a plurality of molding surfaces with a positive configuration corresponding to the optical surface of the optical member provided on another surface of the base board and further lining the first duplication molding section with a base board for the second duplication molding section, thereby forming a second duplication mold;

a first filling process of filling the first hardening resin in a space between the first duplication mold and the one surface of the base board;

a second filling process of filling the first hardening resin in a space between the second duplication mold and the another surface of the base board; and a hardening process of hardening the first hardening resin filled in the spaces on both surfaces of the base board after the first and second filling processes;

wherein in the hardening process, one hardening process conducted on at least one surface of the base board includes a light hardening process to advance hardening by irradiating light to the filled first hardening resin and a heat hardening process to conduct a heating process to the first hardening resin whose hardening has been advanced by the light hardening process so as to advance further the hardening of the first hardening resin.

In this production method of a wafer lens, it is preferable that the heating process is conducted so as to heat the first hardening resin on a condition that the first hardening resin is filled in a space between the first or second duplication molding section and the base board where the light hardening process has been conducted, and the production method further comprises a mold releasing process to release from the duplication mold the first hardening resin whose hardening has been advanced by the heat hardening process.

In this case, it is preferable that the production method further comprises a second heat hardening process to advance hardening by heating the released first hardening resin after the releasing process and a heating temperature during the heat hardening process is lower than that during the second heat hardening process.

Further, in this case, it is preferable that the heat hardening process is conducted at a heating temperature in a range of 70 to 90° C. and the second heat hardening process is conducted at a heating temperature in a range of 100 to 250° C.

In this production method of a wafer lens, it is preferable that the heat hardening process includes a first stage in which hardening is advanced by heating at a first heating temperature and a second stage in which hardening is advanced by heating at a heating temperature higher than the first heating temperature.

In this production method of a wafer lens, it is preferable that the base board is made of a glass, the base boards for the first or second duplication molding section is made of a glass, and a difference between the linear expansion coefficient of the glass of the base board and the linear expansion coefficient of the glass of the base boards for the first or second duplication molding section is $3\times10^{-5}$ [/K].

In this production method of a wafer lens, it is preferable that the first or second duplication mold has a flat section among the plurality of molding surfaces respectively, and a distance between the flat section of the first or second duplication mold and the base board at the time of the first or second filling process is maintained at 100 μm or less.

In this production method of a wafer lens, it is preferable that in the first filling process, after the first hardening resin is dropped or discharged on an upper surface of the base board, the first duplication mold arranged above the base board is brought in contact with the base board in such a condition that the first hardening resin is filled up in a space between the base board and the first duplication mold, and in the second filling process, after the first hardening resin is dropped or discharged on an upper surface of the second duplication mold, the base board arranged above the second duplication mold is brought in contact with the second duplication mold in such a condition that the first hardening resin is filled up in a space between the base board and the second duplication mold.

In this production method of a wafer lens, it is preferable that in the first filling process, after the first hardening resin is dropped or discharged on an upper surface of the first duplication mold, the base board arranged above the first duplication mold is brought in contact with the first duplication mold in such a condition that the first hardening resin is filled up in a space between the base board and the first duplication mold, thereafter, the top of the base board and the bottom of the first duplication mold is reversed as one body on the condition that the base board and the first duplication mold come in contact with each other, and then, in the second filling process, after the first hardening resin is dropped or discharged on an upper surface of the second duplication mold, the base board arranged above the second duplication mold is brought in contact with the second duplication mold in such a condition that the first hardening resin is filled up in a space between the base board and the second duplication mold.

In this production method of a wafer lens, it is preferable that in the hardening process, the first resin filled in a space between the first duplication mold and the base board and the first resin filled in a space between the second duplication mold and the base board are hardened simultaneously.

In this production method of a wafer lens, it is preferable that after the viscosity of the firs hardening resin filled in a space between the first duplication mold and the base board is increased to a predetermined viscosity, the first hardening resin is filled in a space between the second duplication mold and the base board.

In this production method of a wafer lens, it is preferable that a region where the second hardening resin does not exist is provided to a part of the molding surface of the first or second duplication mold in order to relax stress.

Effect of Invention

According to the present invention, the hardening process for a molding member which is made of a hardening resin and is formed in the form of a wafer is conducted in two stages of a light hardening process and a heat hardening process. Therefore, even if a molding member is a large molding member as with a wafer form, the molding member can be harden sufficiently so that it is possible to suppress the optical performance of the molding member from receiving bad influence in subsequent processes. Further, after the process of filling a hardening resin in a space between each of the first and second sub master molds and the base board respectively, the hardening resin is hardened. Accordingly, the hardening resins are hardened and shrink simultaneously at the both surfaces of the base board without being hardened and shrinking solely at only one surface of the base board, and become optical members respectively. Therefore, different from the case where an optical element is provided sequentially on each surface, since warp of the base board can be prevented, the shape accuracy of an optical element can be improved.

EXPLANATION OF REFERENCE SYMBOLS

1 Wafer Lens
3 Glass Base Board
5 Lens section
5A Resin
10 (10A, 10B) Master
12 Base Portion
14 Convex Portion
16 Concave Portion
20 Sub Master
22 Sub Master Molding Section
22A Resin
24 Concave Portion
25 Convex Portion
26 Sub Master Base Board
30 Sub Master
32 Sub Master Molding Section
32A Resin
34 Convex Portion
36 Sub Master Base Board
40 Sub-sub Master
42 Sub-sub Master Molding Section
42A Resin
44 Concave Portion
46 Sub-sub Master Base Board
50, 52, and 54 Light Source
60 Pulling Margin
200 Large Size Sub Master
210 Stress Relaxing Section
B Ball End Mill

BEST MODE FOR CARRYING OUT THE INVENTION

Hereafter, desirable embodiments of the present invention will be described with reference to drawings.

First Embodiment

Figure 1:
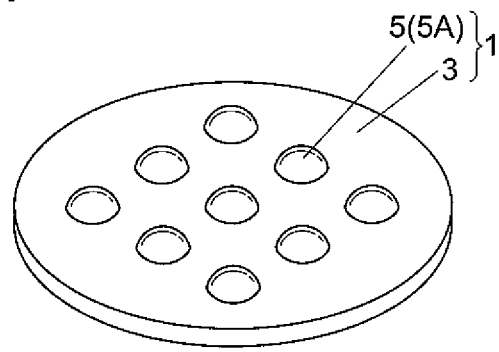
FIG. 1 is a perspective view showing an outline structure of a wafer lens.

As shown in FIG. 1, a wafer lens 1 comprises a disk-shaped glass base board (base board) 3 and plural lens sections (optical member) 5, and has a structure in which the plural lens sections 5 are arranged in an array form on the glass base board 3. The lens sections 5 may be formed on a surface of the glass base board 3, and may be formed on both obverse and reverse surfaces. Further, in the lens section 5, microscopic structures, such as diffractive grooves and level differences, may be provided on a surface of an optical surface.

<Lens Section>

The lens sections 5 are formed by a resin 5A. A hardening resin may be used as this resin 5A. The hardening resin is classified roughly into a light hardening resin and a thereto hardening resin. If the light hardening resin is an acrylic resin or an allylic resin, it can be hardened by radical polymerization. If the light hardening resin is an epoxy type resin, it can be hardened by cationic polymerization. On the other hand, the thermo-hardening resin can be hardened by the radical polymerization or cationic polymerization and can also be hardened by addition polymerization like silicone.

Hereafter, the above-mentioned resins will be explained in detail.

(Acrylic Resin)

(Meth)acrylate used for a polymerization reaction is not limited specifically, and the following (meth)acrylate produced by general production methods can be used. Examples of (meth)acrylate include ester(meth)acrylate, urethane (meth)acrylate, epoxy(meth)acrylate, ether(meth)acrylate, alkyl(meth)acrylate, alkylene(meth)acrylate, (meth)acrylate with an aromatic ring, and (meth)acrylate with an alicyclic structure. These are used solely or in combination of two kinds or more.

Specifically, (meth)acrylate having an alicyclic structure may be desirable, and the alicyclic structure may contain an oxygen atom or a nitrogen atom. For example, employable are cyclohexyl(meth)acrylate, cyclopentyl(meth)acrylate, cycloheptyl(meth)acrylate, bicycloheptyl(meth)acrylate, tricyclo decyl(meth)acrylate, tricyclodecan dimethanol(meta)acrylate, isobornyl(meta)acrylate, hydrogenated dibisphenol (meta)acrylate, and the like. The (meth)acrylate with an alicyclic structure may have preferably an adamantane skeleton. For example, employable are 2-alkyl 2-adamantyl (meth)acrylate (refer to Japanese Unexamined Patent Publication No. 2002-193883), adamantyl di(meta)acrylate (refer to Japanese Unexamined Patent Publication No. 57-500785), adamantyl dicarboxylic acid diallyl (refer to Japanese Unexamined Patent Publication No. 60-100537), perfluoroadamantyl acrylic acid ester (refer to Japanese Unexamined Patent Publication No. 2004-123687), 2-methyl-2-adamantyl methacrylate manufactured by Shin-Nakamura Chemical co., Ltd., 1,3-adamantane diol diacrylate, 1,3,5-adamantan triol triacrylate, unsaturated carboxylic acid adamantyl ester (refer to Japanese Unexamined Patent Publication. No. 2000-119220), 3,3'-dialkoxycarbonyl-1,1'biadamantan (refer to Japanese Unexamined Patent Publication No. 2001-253835), 1,1'-biadamantan compound (refer to U.S. Pat. No. 3,342,880), tetra adamantane (refer to Japanese Unexamined Patent Publication No. 2006-169177), 2-alkyl 2-hydroxy adamantane, 2-alkylene adamantane, a hardening resin with an adamantane skeleton not including an aromatic ring, such as 1,3-adamantane di-tert-butyl dicarboxylate (refer to Japanese Unexamined Patent Publication No. 2001-322950), bis(hydroxyphenyl)adamantanes, and bis(glycidyl oxyphenyl)adamantane (refer to the Japanese Unexamined Patent Publication No. 11-35522 and Japanese Unexamined Patent Publication No. 10-130371).

Further, acrylic resin may contain the other reactive monomers. As (meth)acrylate, for example, employable are methyl acrylate, methyl methacrylate, n-butyl acrylate, n-butyl methacrylate, 2-ethyl hexyl acrylate, 2-ethyl hexyl methacrylate, isobutyl acrylate, isobutyl methacrylate, tert-butyl acrylate, tert-butyl methacrylate, phenyl acrylate, phenyl methacrylate, benzyl acrylate, benzyl methacrylate, cyclohexyl acrylate, cyclohexyl methacrylate, and the like.

As multifunctional (meth)acrylate, for example, employable are trimethylolpropan tri(meth)acrylate, pentaerythritol tetra(meth)acrylate, pentaerythritol tri(meth)acrylate, dipenta erythritol hexa(meth)acrylate, dipenta erythritol penta(meth)acrylate, dipenta erythritol tetra(meth)acrylate, dipentaaerythritol tri(meta)acrylate, tripenta erythritol octa (meth)acrylate, tripentaerythritol hepta(meta)acrylate, ripenta erythritol hexa(meth)acrylate, tripenta erythritol penta (meth)acrylate, tripenta erythritol tetra(meth)acrylate, tripentaerythritol tri(meta)acrylate, and the like.

(Allyl Ester Resin)

Examples of a resin having an allyl group and capable of being hardened by radical polymerization, without specifically being limited thereto, include: aromatic ring-not containing bromine-containing (meth)allyl ester (refer to Japanese Unexamined Patent Publication No. 2003-66201), allyl (meth)acrylate (refer to Japanese Unexamined Patent Publication No, 5-286896), an allyl ester resin (refer to Japanese Unexamined Patent Publication No. 5-286896 and Japanese Unexamined Patent Publication No. 2003-66201), a copolymerization compound of acrylic ester and an epoxy group-containing unsaturated compound (refer to Japanese Unexamined Patent Publication No. 2003-128725), an acrylate compound (refer to Japanese Unexamined Patent Publication No. 2003-447072), and an acrylic ester compound (refer to Japanese Unexamined Patent Publication No. 2005-2064).

(Epoxy Resin)

Any epoxy resin having an epoxy group and capable of causing polymerization and being hardened with light or heat may be used without being limited specifically, and as a hardening initiator, an acid anhydride, a cation generating agent, etc. can be used. Since the hardening shrinkage ratio of an epoxy resin is low, an epoxy resin is desirable in terms of a point that a lens excellent in molding accuracy can be produced.

Types of epoxy include a novolak phenol type epoxy resin, a biphenyl type epoxy resin, and dicyclopentadiene type epoxy resin. Examples of epoxy include bisphenol F diglycidyl ether, bisphenol A diglycidyl ether, 2,2'-bis(4-glycidyl oxycyclohexyl) propane, 3,4-epoxy-cyclohexyl methyl-3,4-epoxycyclohexan carboxylate, vinylcyclohexene dioxide, 2-(3,4-epoxy cyclohexyl)-5,5-spiro(3,4-epoxy cyclohexane)-1,3-dioxane, bis(3,4-epoxy cyclohexyl)adipate, 1,2-cyclopropanedicarboxylate bisglycidyl ester, and the like.

A hardening agent is used to constitute a hardening resin material and is not limited specifically. Further, in the present invention, in the case where the transmittance of an optical material is compared after a hardening resin material and an additive are added, a hardening agent is defined not to be contained in the additive. As a hardening agent, an acid anhydride hardening agent, a phenol hardening agent, etc. can be used preferably. Examples of an acid anhydride hardening agent include phthalic anhydride, maleic anhydride, trimellitic anhydride, pyromellitic anhydride, hexahydro phthalic anhydride, 3-methyl-hexahydro phthalic anhydride, 4-methyl-hexahydro phthalic anhydride, a mixture of 3-methyl-hexahydro phthalic anhydride and 4-methyl-hexahydro phthalic anhydride, tetrahydro phthalic anhydride, nadic anhydride, methyl nadic anhydride, and the like. Further, a hardening accelerator may be contained if needed. Any hardening accelerator which has a good hardenability, does not cause color, and does not spoil the transparency of a thermohardening resin, may be employed without being limited specifically. For example, imidazoles, such as 2-ethyl-4-methylimidazole (2E4MZ), bicyclic amidines and their derivatives, such as tertiary amine, quarternary ammonium salt, and diazabicycloundecen; phosphine, a phosphonium salt, and the like may be employed, and these are used solely or as a mixture of two kinds or more.

(Silicone Resin)

A silicone resin having a siloxane bond in which Si—O—Si is made as a main chain, can be employed. As the silicone resin, a silicone type resin composed of a predetermined amount of a polyorganosiloxane resin can be used (for example, refer to Japanese Unexamined Patent Publication No. 6-9937).

Any thermo-hardening polyorganosiloxane resin which forms a three-dimensional reticular structure with a siloxane bond skeleton by continuous hydrolysis-dehydrating condensation reactions by heat, may be employed without specific limitations. Such a resin generally exhibits hardenability with heating at a high temperature for a long time and has such a characteristic that after it was once hardened, it becomes hardly soft again with heat.

Such a polyorganosiloxane resin includes the following general formula (A) as a constitutional unit, and its configuration may be any one of a chain, a ring, and a reticular configuration.

$$((R_1)(R_2)SiO)_n \tag{A}$$

In the above formula (A), ($R_1$) and ($R_2$) may the same type or different types of substituted or unsubstituted monovalent hydrocarbon groups. Examples of ($R_1$) and ($R_2$) include alkyl groups, such as a methyl group, an ethyl group, a propyl group, and a butyl group; alkenyl groups, such as a vinyl group and an allyl group; allyl groups, such as a phenyl group and a tolyl group; cycloalkyl groups, such as a cyclohexyl group and a cyclooctyl group; and substituted groups in which hydrogen atoms bonding with carbon atoms of the above groups are substituted with a halogen atom, a cyano group, an amino group, and the like and whose exemplified examples include a chloromethyl group, a 3,3,3-trifluoropropyl group, a cyanomethyl group, a γ-aminopropyl group, a N-(β-aminoethyl)-γ-aminopropyl group, and the like. Further, ($R_1$) and ($R_2$) may be groups selected from a hydroxyl group and an alkoxy group. Here, in the above formula (A), "n" represents an integer not less than 50.

The polyorganosiloxane resin is usually used by being dissolved in a hydrocarbon type solvent, such as toluene, xylene and a petroleum type solvent, or in a mixture of these hydrocarbon type solvents and a polar solvent. Further, another solvent having a different composition may be blended within a range that these solvents are dissolved to each other.

The producing method of the polyorganosiloxane resin is not limited specifically, and any well-known method may be employed. For example, the polyorganosiloxane resin may be obtained by the method that one kind of organohalogenosilan or a mixture of two or more kinds of organohalogenosilan is made to cause hydrolysis or alcoholysis, and the polyorganosiloxane resin generally contains a hydrolyzable group such as a silanol group and an alkoxy group and contains these groups 1 to 10 weight % in an amount corresponding to a silanol group.

The above reactions are generally performed in the presence of a solvent which can melt organohalogenosilan. Further, the polyorganosiloxane resin may be obtained by the method that polyorganosiloxane shaped in a straight chain and having an alkoxy group or a halogen atom at an end of its molecular chain is made to cause cohydrolysis with organotrichlorosilan so as to synthesize a block copolymer. Although the polyorganosiloxane resin obtained by the above method generally contains residual HCl, it may be preferable in the composition in this embodiment to use the polyorganosiloxane resin containing 10 ppm or less, preferably 1 ppm or less of HCl from the viewpoint of good preservation stability.

Figure 2:
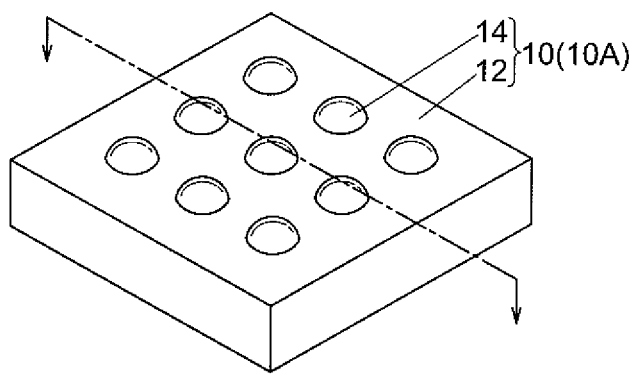
FIG. 2 is a perspective diagram showing an outline structure of a master and a sub master.
Figure 2:
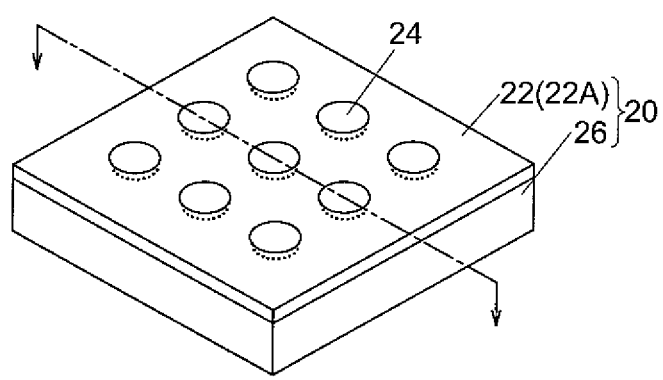

In the production of the wafer lens 1, the master mold (hereafter, merely referred to as a "master") 10 shown in FIG. 2 and the sub master mold (hereafter, merely referred to as a "sub master") 20 are used as a mold for molding.

<Master>

As shown in FIG. 2, in the master 10, plural convex portions 14 are formed in an array form on a base portion 12 in the form of a rectangular parallelepiped shape. The convex portions 14 are portions corresponding to the lens sections 5 of the wafer lens 1 and are protruded in the form of an approximately hemisphere shape. Incidentally, the outer configuration of the master 10 may be such a square in this way, and may be a round shape. Although the range of a patent right of the present invention is not restricted by this difference, hereafter, a square shape is explained as an example.

Figure 4:
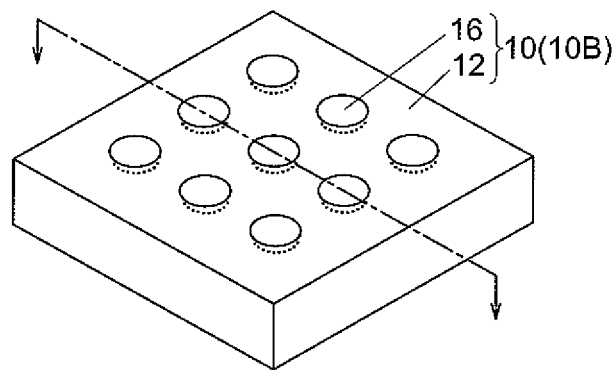
FIG. 4 is a drawing showing an outline structure of a master, a sub master, and a sub-sub master.
Figure 4:
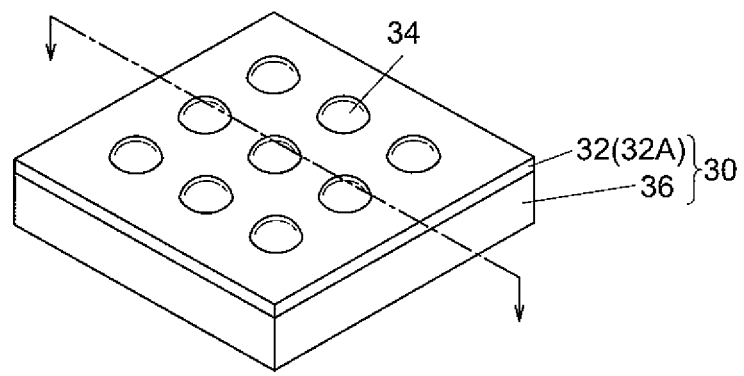
Figure 4:
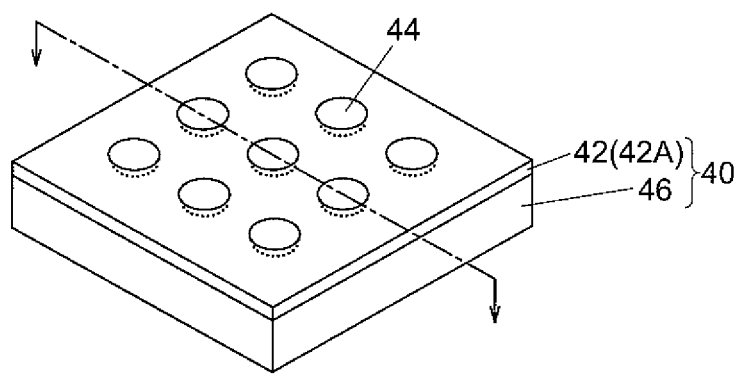

The master 10 may have an optical surface configuration (surface configuration) which may be a convex shape with which each of the plural convex portions 14 is formed as shown in FIG. 2 or may be a concave shape with which each of the plural concave portions 16 is formed as shown in FIG. 4. Here, the surface (molding surface) configuration of each of these convex portions 14 and concave portions 16 is a positive configuration corresponding to the optical surface configuration (the configuration of a surface opposite to the glass base board 3) of each of the lens sections 5 to be transferred and molded on the glass base board 3. In the following explanation, discrimination is made such that the master 10 shown in FIG. 2 is named as "master 10A" and the master 10 shown in FIG. 4 is named as "master 10B".

In the case where an optical surface configuration is produced with a machining process, such as cutting, grinding, etc., a metal or a metallic glass may be used as a forming material of the master 10A. As the classification of the molding material, iron type materials and other alloys may be employable. Examples of the iron type materials include a hot-die steel, a cold-die steel, a plastic-mold steel, a high-speed tool steel, a rolled steel for general structural use, a carbon steel for machine structural use, a chrome molybdenum steel, and a stainless steel. Among them, examples of the plastic-mold steel include a prehardened steel, a quenched and tempered steel, and an aging-treated steel. Examples of the prehardened steel include a SC type steel, a SCM type steel and a SUS type steel. More specifically, the SC type steel includes PXZ. Examples of the SCM type steel include HPM2, HPM7, PX5, and IMPAX. Examples of the SUS type steel include HPM38, HPM77, S-STAR, G-STAR, STAVAX, RAMAX-S, and PSL. Further, examples of the iron type alloy are disclosed by Japanese Unexamined Patent Publication No. 2005-113161 and Japanese Unexamined Patent Publication No. 2005-206913. As non-iron type alloys, a copper alloy, an aluminum alloy and a zinc alloy are mainly known well. Examples of the non-iron type alloys are disclosed in Japanese Unexamined Patent Publication No. 10-219373 and Japanese Unexamined Patent Publication No. 2000-176970. As materials of a metallic glass, PdCuSi, PdCuSiNi, etc. may be suitable, because such a material has a high machinability in a diamond cutting process so that a cutting tool has little abrasion. In addition, amorphous alloys, such as non-electrolytic or electrolytic nickel phosphorus plating may be suitable, because such an alloy has also a high machinability in a diamond cutting process. These high materials having a high machinability may be used to constitute the entire body of the master 10A, or may be used to cover specifically only a surface of an optical transfer surface by a method, such as plating and spattering.

Further, glass may also be used as the forming material of the master 10A, though it may be a little bit difficult to subject the glass to a machining process. If glass is used for the master 10A, a merit to allow a UV light to pass through can be also obtained. Glasses used generally may be used without being limited particularly.

Specifically, as the materials for the mold shaping of the master 10A, materials capable of securing flowability easily at low temperature, such as a low melting point glass and a metallic glass may be employable. If a low melting glass is used, since irradiation can be also made from a mold side of a sample at the time of molding a UV hardening type material, it is advantageous. The low melting point glass has a glass transition point of about 600° C. or less and a glass composition of $ZnO$—$PbO$—$B_2O_3$, $PbO$—$SiO_2$—$B_2O_3$, $PbO$—$P_2O_5$—$SnF_2$, or the like. Moreover, a glass capable of melting at 400° C. or less has a glass composition of $PbF_2$—$SnF_2$—$SnO$—$P_2O_5$ or the similar structure. Specific examples of the glass materials include, without being limited thereto, S-FPL51, S-FPL53, S-FSL5, S-BSL7, S-BSM2 S-BSM4, S-BSM9, S-BSM10, S-BSM14, S-BSM15, S-BSM16, S-BSM18, S-BSM22, S-BSM25, S-BSM28, S-BSM71, S-BSM81, S-NSL3, S-NSL5, S-NSL36, S-BAL2 S-BAL3, S-BAL11, S-BAL12, S-BAL14, S-BAL35, S-BAL41, S-BAL42, S-BAM3, S-BAM4, S-BAM12, S-BAH10, S-BAH11, S-BAH27, S-BAH28, S-BAH32, S-PHM52, S-PHM53, S-TIL1, S-TIL2, S-TIL6, S-TIL25, S-TIL26, S-TIL27, S-TIM1, S-TIM2, S-TIM3, S-TIM5, S-TIM8, S-TIM22, S-TIM25, S-TIM27, S-TIM28, S-TIM35, S-TIM39, S-TIH1, S-TIH3, S-TIH4, S-TIH6, S-TIH10, S-TIH11, S-TIH13, S-TIH14, S-TIH18, S-TIH23, S-TIH53, S-LAL7, S-LAL8, S-LAL9, S-LAL10, S-LAL12, S-LAL13, S-LAL14, S-LAL18, S-LAL54, S-LAL56, S-LAL58, S-LAL59, S-LAL61, S-LAM2, S-LAM3, S-LAM7, S-LAM51, S-LAM52, S-LAM54, S-LAM55, S-LAM58, S-LAM59, S-LAM60, S-LAM61, S-LAM66, S-LAH51, S-LAH52, S-LAH53, S-LAH55, S-LAH58, S-LAH59, S-LAH60, S-LAH63, S-LAH64, S-LAH65, S-LAH66, S-LAH71, S-LAH79, S-YGH51, S-FTM16, S-NBM51, S-NBH5, S-NBH8, S-NBH51, S-NBH52, S-NBH53, S-NBH55, S-NPH1, S-NPH2, S-NPH53, P-FK01S, P-FKH25, P-SK5S, P-SK12S, P-LAK13S, P-LASF03S, P-LASFH11S, P-LASFH12S and the like.

Moreover, the metallic glass can be similarly shaped easily by molding. Examples of the metallic glass are disclosed by the Japanese Unexamined Patent Publication Nos. 8-109419, 8-333660, 10-81944, 10-92619, 2001-140047, 2001-303218, and 2003-534925. However, examples of the metallic glass are not limited thereto specifically.

The optical surface of the master 10A may be a surface on which a single convex portion 14 is formed or may be a surface on which plural convex portions 14 are formed in an array form as shown in FIG. 2. Examples of the method of shaping the optical surface of the master 10A include a diamond cutting process.

If the optical surface of the master 10A is a surface on which a single convex portion 14 is formed, the optical surface can be formed by a cutting process with a lathe and a tool of a diamond by the use of a material of nickel phosphorus, an aluminum alloy, a free-cutting brass alloy, or the like as a mold material.

If the optical surface of the master 10A is a surface on which plural convex portions 14 are formed in an array form, the optical surface configuration can be formed by a cutting process with a ball end mill in which a cutting edge is flamed with a diamond. At this time, it is preferable that the cutting edge of a tool is not a perfect circular arc and that since an error may take place on a processing shape depending on a used position of the cutting edge, the cutting process is conducted while the inclination of the tool is adjusted in such a way that a used position of the cutting edge is made at the same position even when the cutting edge cuts any portion of the optical surface configuration.

Concretely, firstly, with a triaxial translational operation, the center of a circular arc of a cutting edge of a ball end mill B is positioned on a normal line on a processed surface at a point where a tool comes in contact with a work piece. Further, by the use of a rotation axis, a used position B1 of the cutting edge is positioned to come to a contact point between the tool and the work piece. With operations to conduct such a tool position control continuously, a cutting process of an optical surface configuration is performed.

In order to perform such processing, a processing machine needs to have at least degrees of translational freedom being 3 and degrees of rotational freedom being 1, Accordingly, the processing cannot be realized unless a processing machine has total degrees of freedom being 4 or more. Therefore, in the case of shaping the optical surface of the master 10A, a processing machine has degrees of freedom being 4 or more is employed.

<Sub Master>

A sub master 20 is constituted by a sub master molding section 22 and a sub master base board 26 as shown in FIG. 2. On the sub master molding section 22, plural concave portions 24 are formed in at an array form. The surface (shaping surface) configuration of each of the concave portions 24 is a negative configuration corresponding to each of the lens sections 5 in the wafer lens 1, and the surface configuration is dented in an approximately hemisphere configuration in this figure.

<<Sub Master Molding Section>>

The sub master molding section 22 is formed with a resin 22A. As the resin 22A, a resin having a good mold release characteristic, especially a transparent resin is desirable, because the resin excels in the point that it can be released from a mold without being applied with a releasing agent. The resin may be any one of a light hardening resin, a thermo-hardening resin, and a thermoplastic resin.

Examples of the light hardening resin include a fluorine type resin, and examples of the thermo-hardening resin include a fluorine type resin and a silicone type resin. Among them, a resin with a good mold release characteristic, that is, a resin having a low surface energy at the time of being hardened is desirable. Examples of the thermo-hardening resin include an olefin type resin being transparent and having a comparatively good mold release characteristic, such as polycarbonate and cycloolefin polymer. Here, the mold release characteristic becomes good in the order of a fluorine type resin, a silicone type resin and an olefin type resin. In this case, it may be permissible not to employ the sub maser base board 26. When such resin is used, since the resin can be deflected, it becomes more advantageous in the case of being released from a mold.

Hereafter, a fluorine type resin, a silicone type resin, and a thermoplastic resin will be explained in detail.

(Fluorine Type Resin)

Examples of the fluorine type resin, include PTFE (polytetrafluoroethylene), PFA (tetrafluoroethylene perluoro alkyl vinyl ether copolymer), FEP (tetrafluoroethylene hexafluoro propylene copolymer (4,6 fluorinated)), ETFE (tetrafluoroethylene ethylene copolymer), PVDF (polyvinylidene fluoride (2 fluorinated)), PCTFE (polychlorotrifluoroethylene resin (3 fluorinated)), ECTFE (chlorotrifluoroethylene ethylenic copolymer), PVF (polyvinyl fluoride), and the like.

The fluorine system resin has advantages in mold-release characteristic, heat resistance property, chemical resistance property, insulation property, low friction property, and the like, but being inferior in transparency as drawback because of its crystallinity. Since fluorine system resin has a high melting point, it requires a high temperature (about 300° C.) at the time of being shaped.

Further, examples of the molding method include a casting molding, an injection molding, an extrusion molding, a blow molding, a transfer molding, and the like. Among the above the fluorine type resins, FEP, PFA, PVDF, etc. are specifically preferable, because they are excellent in light permeability and can be subjected to an injection molding and an extrusion molding.

As a grade capable of being subjected to a melt molding, for example, Fluon PFA manufactured by Asahi Glass Company, and Dyneon PFA and Dyneon THV manufactured by Sumitomo 3M Limited may be employed. Especially, a Dyneon THV series is preferable, the reason is that since it has a low melting point (about 120° C.), it can be molded at a comparatively low temperature and has a high transparency.

Further, as a thermo-hardening amorphous fluorine resin, CYTOP grade S manufactured by Asahi Glass Company is desirable, because it has a high transmittance and a good mold-release characteristic.

(Silicone Type Resin)

A silicone type resin has a one liquid component moisture hardening type, a two liquid component addition reaction type and a two liquid component condensation type.

The silicone type resin has advantages in mold-release characteristics, flexibility, heat resistance property, incombustibility, moisture permeability, low water absorption property, many transparent grades and the like, but has large linear expansion coefficient as drawback.

Especially, a silicone type resin which includes a PDMS (poly dimethyl siloxane) structure and is used for a mold making application is preferable because of good mold-release characteristic, and its RTV elastomer with a high transparency grade is desirable. Further, for example, TSE3450 (two liquid mixing, addition type) manufactured by Momentive Performance Materials Inc., ELASTOSIL M 4647 (two liquid type RTV silicone rubber) manufactured by WACKER ASAHIKASEI SILICONE CO., LTD., KE-1603 (two liquid mixing, addition type RTV rubber) manufactured by Shin-Etsu Chemical Co, Ltd., SH-9555 (two liquid mixing, addition type RTV rubber), SYLGARD 184, Silpot 184, WL-5000 series (photosensitive silicone buffer material and patterning possible with UV) manufactured by Dow Corning, Toray Industries, and the like may be employed.

As a molding method, in the case of tow liquid type RTV rubber, it can be hardened at room temperature or with heat (Thermoplastic Resin)

As a thermoplastic resin, transparent resins, such as an alicyclic hydrocarbon type resin, an acrylic resin, a polycarbonate resin, a polyester resin, a polyether resin, a polyamide resin, and a polyimide resin, may be employable. However, among them, an alicyclic hydrocarbon type resin may be used preferably. If a sub master 20 is constituted with a thermoplastic resin, the injection molding technique having been employed heretofore can be diverted as it is, so that the sub master 20 can be produced easily. Further, if the thermoplastic resin is an alicyclic hydrocarbon type resin, since its hygroscopic property is very low, the service life of the sub master 20 becomes long. Further, an alicyclic hydrocarbon type resins, such as a cycloolefin resin is excellent in light resistance and light transmissivity. Therefore, even in the case where light with short wavelength, such as UV light is used to harden an active light hardening resin, since the alicyclic hydrocarbon type resin hardly deteriorates, the resin can be used as the material of a mold for a long period of time.

As an alicyclic hydrocarbon type resin, a composition represented with the following formula (1) is exemplified.

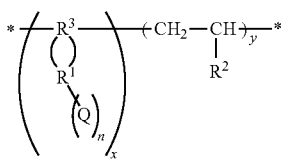
(1)

In the abovementioned formula (1), "x" and "y" represent a copolymerization ratio and are real numbers respectively which satisfy a conditional formula ($0/100 \leq y/x \leq 95/5$). "n" is 0, 1 or 2 and represents the number of substitutions. "R1" is a (2+n) valent group of one kind or two or more kinds selected from a group of a hydrocarbon group with 2 to 20 carbon atoms. "R2" is a hydrogen atom or is composed of carbon and hydrogen and is a monovalent group of one kind or two or more kinds selected from a structure group with 1 to 10 carbon atoms. "R3" is a divalent group of one kind or two or more kinds selected from a group of a hydrocarbon group with 2 to 20 carbon atoms. "Q" is a monovalent group of one kind or two or more kinds selected from a structure group represented by COOR4 (R4 is a hydrogen atom or is composed of hydrocarbons and is a monovalent group of one kind or two or more kinds selected from a structure group with 1 to 10 carbon atoms).

In the general formula (1), R1 is preferably a divalent group of one kind or two or more kinds selected from a group of a hydrocarbon group with 2 to 12 carbon atoms, more preferably, R1 is a divalent group represented by the following general formula (2) (in the formula (2), p is an integer of 0 to 2, still more preferably, a divalent group with p being 0 or 1 in the following general formula (2).

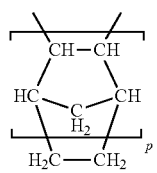
(2)

The structures of R1 may be used with one kind thereof solely or with two or more kinds in combination. Examples of R2 include a hydrogen atom, a methyl group, an ethyl group, a n-propyl group, an i-propyl group, a n-butyl group, a 2-methylpropyl group, and the like. R2 is preferably a hydrogen atom and/or a methyl group, and most preferably a hydrogen atom. Examples of R3, as examples of a structural unit including this group, in the case of n=0, the following formulas (a), (b) and (c) (provided that in the formulas (a), (b) and (c), R1 is as mentioned in the above). Further, n is preferably 0.

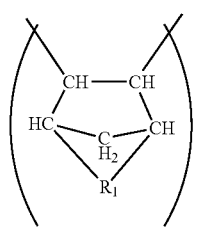
(a)

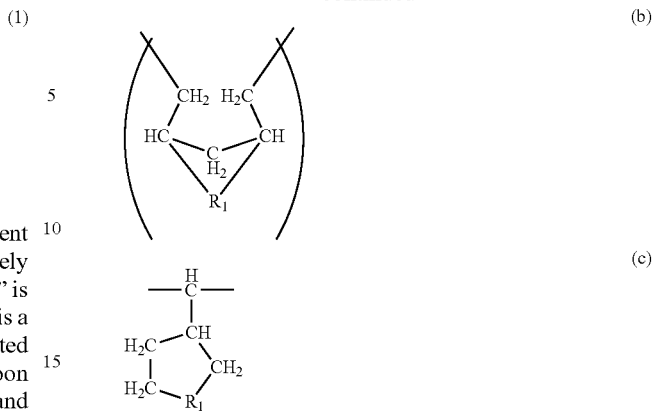

(b)

(c)

In this embodiment, the type of copolymerization is not limited to specifically, and any type of well-known copolymerization, such as random copolymerization, block copolymerization, and alternating copolymerization, may be applied, however, random copolymerization is preferable.

Further, the polymer used in this embodiment may have a repetitive structural unit derived from monomer capable per forming other copolymerization if needed in the range that does not spoil the physical properties of a product obtained by the molding method of this embodiment. Although its copolymerization ratio is not limited to specifically, it is preferably 20 mol % or less, more preferably 10 mol % or less. If it is made copolymerization more than that, there is fear that an optical characteristic may be spoiled and an optical component with high precision may not be obtained. At this time, the type of copolymerization is not restricted specifically. However, random copolymerization is desirable.

Another example of a preferable thermoplastic alicyclic hydrocarbon type polymer applied to the sub master 20 is exemplified as a polymer which contains a repeating unit (a) having an alicyclic structure represented by the following general formula (4) and a repeating unit (b) with a chain structure represented by the following formula (5) and/or the following formula (6) and/or the following formula (7) in such a way that the total content of them becomes 90 weight % or more and the content of the repeating unit (b) is 1 weight % or more and less than 10 weight %.

(4)

(5)

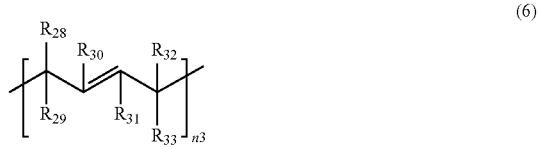
(6)

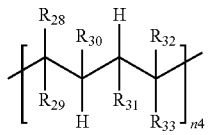
(7)

In the formula (4), the formula (5), the formula (6), and the formula (7), $R_{21}$ to $R_{33}$ are independently a hydrogen atom, a chain-shaped hydrocarbon group, a halogen atom, an alkoxy group, a hydroxy group, an ether group, an ester group, a cyano group, an amino group, an imido group, a silyl group, or a chain-shaped hydrocarbon group substituted with a polar group (a halogen atom, an alkoxy group, a hydroxy group, an ester group, a cyano group, an amide group, an imido group, or a silyl group). Concretely, examples of a halogen atom include a fluorine atom, a chlorine atom, a bromine atom, and an iodine atom, and examples of a chain-shaped hydrocarbon group substituted with a polar group, include a halogenated alkyl group with 1 to 20 carbon atoms, preferably 1 to 10 carbon atoms, more preferably 1 to 6 carbon atoms. Examples of a chain-shaped hydrocarbon group include an alkyl group with 1 to 20 carbon atoms, preferably 1 to 10 carbon atoms, more preferably 1 to 6 carbon atoms, and an alkenyl group with 2 to 20 carbon atoms, preferably 2 to 10 carbon atoms, more preferably 2 to 6 carbon atoms.

In the above formula (4), X represents an alicyclic hydrocarbon group, and the number of carbons constituting this group is usually 4 to 20, preferably 4 to 10, more preferably 5 to 7. If the number of carbons constituting the alicyclic hydrocarbon group is made within this range, the characteristic of birefringence can be reduced. Further, the alicyclic hydrocarbon group is not limited to a single ring structure and may be a multi ring structure such as a norbornane ring.

Although the alicyclic hydrocarbon group may have a carbon-carbon unsaturated bond, the content of carbon-carbon unsaturated bond 10% or less, preferably 5% or less, more preferably 3% or less to the total carbon-carbon bonds. If the carbon-carbon unsaturated bond of the alicyclic hydrocarbon group is made within this range, transparency and heat-resistance can be improved. Further, the carbons constituting the alicyclic hydrocarbon group may be made to bond with a hydrogen atom, a hydrocarbon group, a halogen atom, an alkoxy group, a hydroxy group, an ester group, a cyano group, an amide group, an imido group, a silyl group, or a chain-shaped hydrocarbon group substituted with a polar group (a halogen atom, an alkoxy group, a hydroxy group, an ester group, a cyano group, an amide group, an imido group, or a silyl group). Among them, a hydrogen atom or a chain-shaped hydrocarbon group with 1 to 6 carbon atoms is preferable in terms of heat resistance and low water absorption property.

Further, although the above formula (6) includes a carbon-carbon unsaturated bond in a main chain and the above formula (7) includes a carbon-carbon saturated bond in a main chain, in the case where transparency and heat resistance are required strongly, the content of the unsaturated bond is usually 10% or less, preferably 5% or less, more preferably 3% or less to the total carbon-carbon bonds constituting the main chain.

In the alicyclic hydrocarbon type copolymer in this embodiment, the total content of the repeating unit (a) having the alicyclic structure represented by the general formula (4) and the repeating unit (b) of the chain structure represented by the general formula (5), and/or the general formula (6), and/or the general formula (7) is usually 90% or more on mass standard, preferably 95% or more, and more preferably 97% or more. If the total content is made within the above range, low birefringence properties, heat resistance properties, low water absorption properties, and machine strength balance highly.

As a production method of producing the above alicyclic hydrocarbon type copolymer, employed is a method of copolymerizing an aromatic vinyl type compound and other monomer capable of copolymerizing with the aromatic vinyl type compound so as to hydrogenate carbon-carbon unsaturated bonds of a main chain and an aromatic ring.

The molecular weight of the copolymer before hydrogenating is in a range of 1,000 to 1,000,000, preferably 5,000 to 500,000, more preferably 10,000-300,000 by polystyrene (or polyisoprene) conversion weight-based average molecular weight (Mw) measured by GPC. If the weight-based average molecular weight (Mw) of the copolymer is excessively small, the strength property of a molded product of an alicyclic hydrocarbon type copolymer obtained from it becomes poor, in contrast, if it is excessively large, the hydrogenation reaction properties become poor.

Specific examples of aromatic vinyl type compounds used in the above method include, for example, styrene, α-methylstyrene, α-ethylstyrene, α-propylstyrene, α-isopropylstyrene, α-t-butyl styrene, 2-methylstyrene, 3-methylstyrene, 4-methylstyrene, 2,4-diisopropylstyrene, 2,4-dimethylstyrene, 4-t-butyl styrene, 5-t-butyl-2-methylstyrene, monochlorostyrene, dichlorostyrene, monofluorostyrene, 4-phenylstyrene, and the like. Among them, styrene, 2-methylstyrene, 3-methylstyrene, 4-methylstyrene, etc. may be preferably usable. These aromatic vinyl type compounds can be used solely respectively, or can be used in combination of two or more kinds.

The other monomers capable of copolymerizing are not limited to specifically. However, a chain-shape vinyl compound, a chain-shaped conjugated diene compound, etc. may be employed, and when a chain-shaped conjugated diene is used, the operability in a production process of it is excellent and the strength properties of the alicyclic hydrocarbon type copolymer obtained from it is excellent.

Examples of chain vinyl compounds include, for example, ethylene, propylene, chain-shaped olefin monomers; such as 1-butene, 1-pentene, 4-methyl-1-pentene; nitrile system monomers; such as 1-cyanoethylenes(acrylonitrile), 1-cyano 1-methyl ethylene (meth-acrylonitrile), and 1-cyano-1-chloroethylene (α-chloroacrylonitrile); (meth)acrylic ester type monomers, such as 1-(carbomethoxy)-1-methyl ethylene (methacrylic acid methyl ester), 1-(carboethoxy)-1-methyl ethylene (methacrylic acid ethyl ester), 1-(carbopropoxy)-1-methyl ethylene (methacrylic acid propyl ester), 1-(carbobutoxy)-1-methyl ethylene (methacrylic acid butyl ester), 1-carbomethoxyethylene (acrylic acid methyl ester), 1-carboethoxyethylene (acrylic acid ethyl ester), 1-carbopropoxyethylene (acrylic acid propyl ester) and 1-carbobutoxyethylene (butyl acrylate ester); unsaturated fatty acid type monomers, such as 1-carboxyethylene (acrylic acid), 1-carboxy-1-methyl ethylene (methacrylic acid) and maleic anhydride, and the like. Among them, especially, a chain-shaped olefin monomer is preferable, and ethylene, propylene, and 1-butene are the most preferable.

Examples of the chain-shaped conjugated diene include, for example, 1,3-butadiene, isoprene, 2,3-dimethyl-1,3-butadiene, 1,3-pentadiene, 1,3-hexadiene, and the like. Among these chain-shaped vinyl compounds and chain-shaped conjugated diene, the chain-shaped conjugated diene is desirable, and butadiene and isoprene are particularly desirable. These chain-shaped vinyl compounds and chain-shaped conjugated diene may be used solely respectively, or may be used in combination of two or more kinds.

A polymerization reaction, such as radical polymerization, anionic polymerization, cationic polymerization, has not specific restriction. However, in consideration of easiness in polymerization operation and hydrogenation reaction in a post process and the mechanical strength of a hydrocarbon type copolymer obtained eventually, anionic polymerization method is desirable.

In the case of anionic polymerization, methods, such as block polymerization, solution polymerization, and slurry polymerization may be employed in the presence of an initiator at a temperature in a range of 0° C. to 200° C., preferably 20° C. to 100° C., more preferably 20° C. to 80° C. However, in consideration of the eliminating of reaction heat, solution polymerization may be preferable. In this case, an inert solvent capable of dissolving a polymer and its hydride may be employed. Examples of the inert solvent employed in a solution reaction include, for example, aliphatic hydrocarbons, such as n-butane, n-pentane, iso-pentane, n-hexane, n-heptane, and iso-octane; alicyclic hydrocarbons, such as cyclopentane, cyclohexane, methylcyclopentane, methylcyclohexane, and decalin; aromatic hydrocarbons, such as benzene and toluene, and the like. Examples of the initiator of the above anionic polymerization include, for example, monoorganic lithium, such as n-butyl lithium, sec-butyl lithium, t-butyl lithium, hexyllithium, and phenyllithium; polyfunctional organic lithium compounds, such as dilithiomethan, 1,4-diobutane and 1,4-dilithio-2-ethylcyclohexane.

In the case of conducting hydrogenating reactions for carbon-carbon double bonds in unsaturated rings, such as an aromatic ring and a cycloalkane ring and unsaturated bonds in a main chain in a copolymer before hydrogenating, a reaction method and a reaction mode are not limited specifically and the reaction may be conducted in accordance with any well-know method. However, a hydrogenating method with which a hydrogenation rate can be made high and a polymer chain scission reaction taking place simultaneously with a hydrogenation reaction is few, may be preferable. For example, preferable is a method conducting a hydrogenation reaction by the use of catalyst containing at least one metal selected from nickel, cobalt, iron, titanium, rhodium, palladium, platinum, ruthenium, and rhenium in an organic solvent. The hydrogenation reaction is usually conducted at a temperature of 10° C. to 250° C. However, from the reason that a polymer chain scission reaction taking place simultaneously with a hydrogenation reaction can be minimized, the hydrogenation reaction is preferably conducted at a temperature of 50° C. to 200° C., more preferably 80° C. to 180° C. Further, a hydrogen pressure is usually 0.1 MPa to 30 MPa. However, in addition to the above reason, form the viewpoint of operability, the hydrogen pressure is preferably 1 MPa to 20 MPa, more preferably 2 MPa to 10 MPa.

The hydrogenation rate of the thus-obtained hydrogenated product is usually 90% or more, preferably 95% or more, more preferably 97% or more in any one of carbon-carbon unsaturated bonds in main chains, carbon-carbon double bonds in aromatic rings and carbon-carbon double bonds in unsaturated rings in the measurement according to $^1$H-NMR. If the hydrogenation rate is low, the low birefringence properties, thermal stability, and the like of the obtained copolymer may lower.

A method of collecting a hydrogenated product after the termination of the hydrogenation reaction is not limited specifically. Usually employed may be a method of removing solvent from the solution of the hydrogenated product by directly drying after hydrogenation catalyst residue is removed by a method such as filtration, centrifugal separation or the like, and a method of put the solution of the hydrogenated product into a poor solvent for the hydrogenated product and solidifying the hydrogenated product.

<<Sub Master Base Board>>

The sub master base board 26 is a lining material on which a resin (the sub master molding section 22) is pasted so that in the case where the strength of the sub master 20 is insufficient only with the sub master molding section 22, the strength of the sub master 20 can be increased with the lining material (the sub master base board 26) and the sub master 20 can be used repeatedly for shaping.

As the sub master base board 26, any material capable of providing smoothness, such as quartz, silicon wafer, metal, glass, and resin may be employed.

From a viewpoint of transparency, that is, in consideration of the point to allow the sub master 20 to be irradiated with UV rays from any one of its top and bottom sides, transparent materials, such as quartz, glass, and resin may be preferable. As a transparent material, any one of a thermoplastic resin, a thermo-hardening resin, and a UV hardening resin may be employed. Further, effects, such as an effect to make a linear expansion coefficient lower by the addition of fine particles into resin may be permissible. When such a resin is used, since the resin deflects more than glass, the resin is released easily from a mold. However, since such a resin has a large linear expansion coefficient, there is a drawback that if heat is generated at the time of UV irradiation, the configuration is deformed so that transfer cannot be made clearly.

Here, the linear expansion coefficient the sub master base board 26 is preferably close to that of the glass base board 3 on which a hardening resin for a lens is formed, in order to further prevent dimension errors from taking place in the in-plane direction of a glass base board. Specifically, a difference in linear expansion coefficient between them is preferably $3\times10^{-5}$ [/K] or less. In this sense, it may be preferable that the sub master base board 26 is also a glass base board.

Next, a producing method of a wafer lens 1 will be explained with reference to FIG. 3.

Figure 3A:
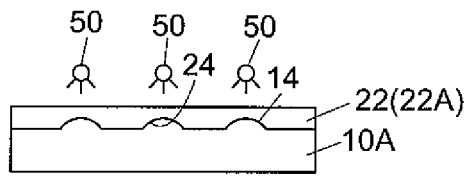
FIGS. 3a-3f are illustrations for explaining a producing method of a wafer lens.

As shown in FIG. 3(a), a resin 22A is coated on a master 10A so that convex portions 14 on the master 10A are transferred to the resin 22A, and then the resin 22A is hardened so that plural concave portions 24 are formed on the resin 22A, whereby a sub master molding section 22 is formed.

Figure 9:
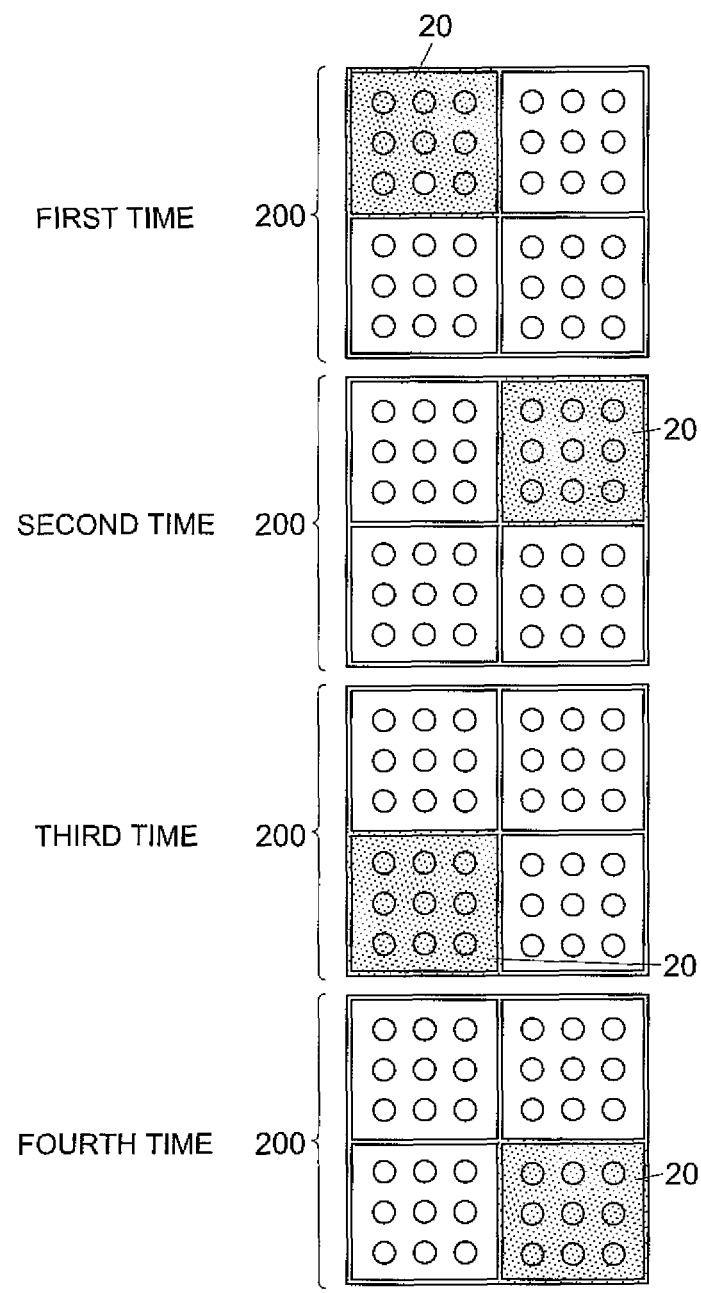
FIG. 9 is an illustration for schematically explaining a situation that a lens section is formed on both obverse and reverse surfaces of a glass base board by the use of a large size sub master and a normal size sub master.

Here, in FIG. 3, in the master 10A and the sub master molding section 22, the concave portions and the convex portions are formed with the same number. However, the sub maser molding section 22 is required to have a large number of molding sections with a negative configuration on a large area as a wafer lens. Therefore, it may be preferable to employ a method which conducts molding with a master 10A with a small area by a stepping and repeating technique so as to form a mold having a large number of molding sections with a large area as with the sub master molding section. For example, with the master 10A having optical surface configurations of 3×3, an imprint molding is conducted by shifting the position of the master 10A sequentially on the resin 22A constituting the sub master molding section, whereby it becomes possible to form a sub master molding section having molding surfaces corresponding to the optical surface configurations of 6×6 as shown in FIG. 9. The resin 22A may be any one of a thermo-hardening type, a light hardening type, and a volatilization hardening type (HSQ (hydrogen silsesquioxan etc.) which are hardened by the volatilization of a solvent). In the case where a transfer capability to mold precisely is deemed as more important, it is preferable to mold with a UV hardening type or volatilization hardening type resin, because heat is not applied for hardening so that the influence by the thermal expansion of the resin 22A is small. However, it is not necessary to limit to them. If the resin 22A has a good detachability from the master 10A after the hardening, a large force is not needed at the time of the detaching. As a result, it is more preferable, because a molded optical surface configuration is not deformed carelessly by such a large force.

In the case where the resin 22A (the material of the sub master molding section 22) and the resin 5A (the material of the lens section 5) area hardening type resin, it is preferable to design the optical surface configuration (convex portion 14) of the master 10A in consideration of shrinkage due to the hardening of the resin 22A and shrinkage due to the hardening of the resin 5A.

At the time of coating the resin 22A on the master 10A, a method of a spray coating, a spin coating, or the like may be employed. In this case, the resin 22A may be coated while being vacuumed. If the resin 22A is coated while being vacuumed, the resin 22A can be hardened without being mixed with air bubbles.

Here, an example of coating a resin on the master 10A is shown. However, a resin to form the sub master molding section may be dropped or discharged on a separately-arranged base board at a position where the master 10A is imprinted, then the resin is imprinted with the master 10A and hardened, whereby the sub master molding section is formed.

Moreover, in order to enhance a mold-release characteristic for the sub master resin 22A, in the present invention, it is more desirable to coat a mold releasing agent to the surface of the master 10A.

In the case of coating a mold releasing agent, the master 10A is subjected to surface reformation. Specifically, OH groups are made to stand on the surface of the master 10A. As a method of surface reformation, any one of methods to make OH groups to stand on the surface of the master 10A, such as UV ozone washing, oxygen plasma aching, and the like may be employed.

As the mold releasing agent, employable is a material in which a functional group capable of hydrolyzing is bonded at its terminal as with a silane coupling agent structure, that is, an agent having such a structure that bonds by causing dehydration condensation or a hydrogen bond between it and OH groups existing on the surface of a metal. In the case of an agent which has a silane coupling agent structure at its one terminal and a mold releasing function at its another terminal, the more, OH groups are formed on the surface of the master 10A, the more, locations of a covalent bonding on the surface of the master 10A increase, so that the bonding can be made more firmly. As a result, even if the master 10A is used many times for molding, its durability increases without losing the mold releasing effect. Moreover, since a primer layer (a foundation layer, a $SiO_2$ coat, etc.) becomes unnecessary, the mold releasing agent can obtain an effect to improve durability while keeping a thin layer.

Examples of the material in which a functional group capable of hydrolyzing is bonded at its terminal, include materials having an alkoxy silane group, a halogenated silane group, a quarternary ammonium salt, a phosphoester group, etc. preferably as a functional group. Further, the terminal group may be a group causing a strong bond with a metal mold, for example, as with triazine thiol. Specifically, the material has an alkoxy silane group (8) or a halogenated silane group (9) shown by the following Formulas.

  (8)

  (9)

In the above formulas, R1 and R2 represent an alkyl group (for example, a methyl group, an ethyl group, a propyl group, a butyl group, etc.), n and m are 1, 2 or 3 respectively, R3 represents an alkyl group (for example, a methyl group, an ethyl group, a propyl group, a butyl group, etc.) or an alkoxy group (for example, a methoxy group, an ethoxy group, a butoxy group, etc.). X represents a halogen atom (for example, Cl, Br, I).

Moreover, in the case where two or more R1s, R2s, R3s, or Xs combine with Si, two Rms may be different, for example, as with an alkyl group and an alkoxy group within the range of the above-mentioned groups or the atoms.

Alkoxy silane group-SiOR1 and a halogenated silane group-SiX react with moisture so as to become —SiOH. Further this product (—SiOH) causes dehydration condensation or a hydrogen bond between it and OH groups existing on the surface of mold materials such as a metal and bond with the surface.

FIG. 12 shows a reaction diagram between a mold releasing agent which employs an alkoxy silane group at its terminal as an example of a functional group capable of hydrolyzing and OH groups on the surface of the master 10A.

Figures 12A, 12B, 12C:
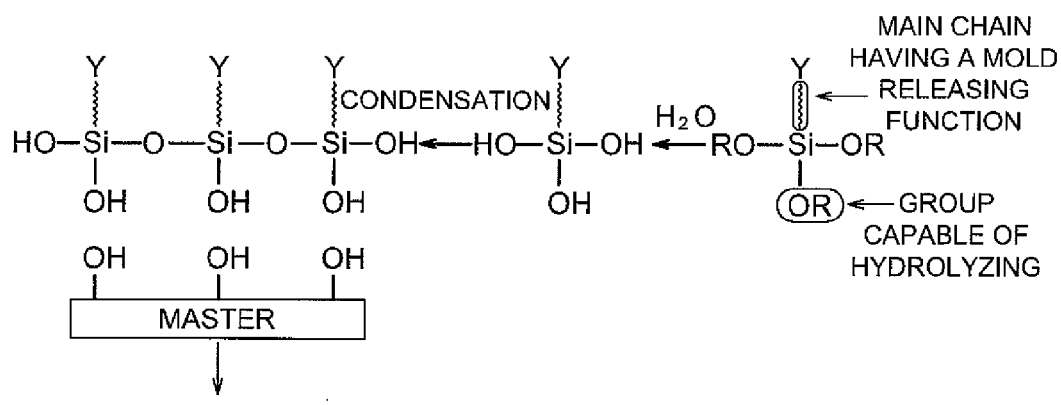
FIGS. 12a-12e are illustrations showing reactions between OH groups on a surface of a master and a mold releasing agent employing an alkoxy silane group as one example of a functional group which can hydrolyze at an end.
Figures 12D, 12E:
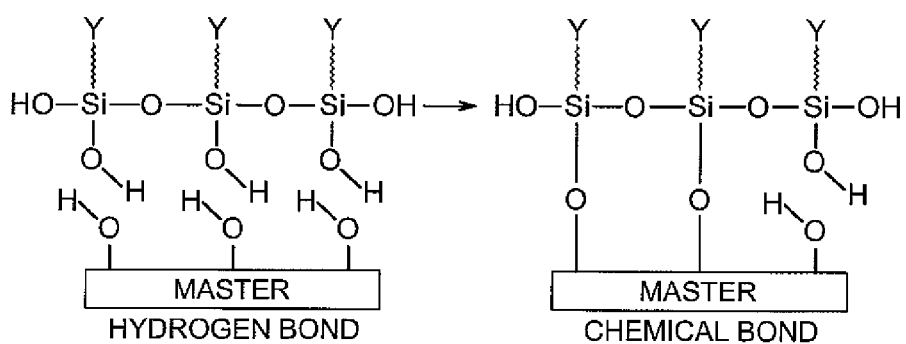
Figure 13A:
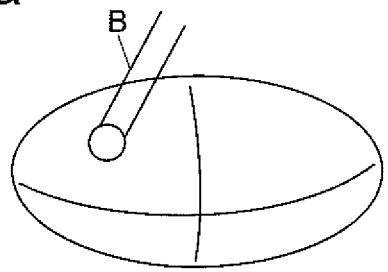
FIGS. 13a-13c are illustrations for explaining the producing method of a molding surface with a ball end mill.
Figure 13B:
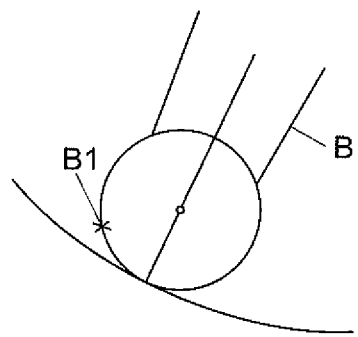
Figure 13C:
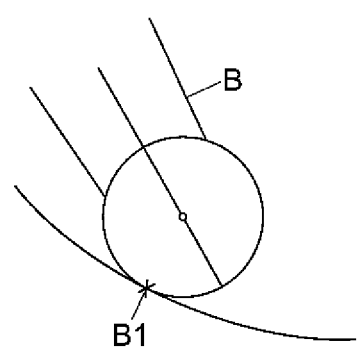

In FIG. 12(a), —OR represents methoxy (—$OCH_3$) or ethoxy (—$OC_2H_5$), generates methanol ($CH_3OH$) or ethanol ($C_2H_5OH$) by hydrolysis, and becomes silanol (—SiOH) shown in FIG. 12(b). Then, the resultant silanol causes dehydration condensation partially, and becomes a condensation product of silanol as shown in FIG. 12(c). Further, as shown in FIG. 12(d), the resultant product adsorbs by hydrogen bond with OH groups on the surface of the master 10 (inorganic material), finally, as shown in FIG. 12(e), the resultant product causes dehydration, and forms —O— chemical bond (covalent bond). Although FIG. 12 shows an example of an alkoxy silane group, the similar reactions are also caused basically in the case of a halogenated silane group.

That is, the mold releasing agent used in the present invention chemically bonds with the surface of the master 10A by its one end and orients a functional group to its other end so as to cover the master 10A, whereby a uniform releasing layer being thin and excellent in durability can be formed.

Examples of a preferable structure at a side having a mold releasing function include structures having a low surface energy, such as a fluorine-substituted hydrocarbon group and a hydrocarbon group.

(Mold Releasing Agent having a Fluorine Group at its Functional Side)

As the fluorine-substituted hydrocarbon group, specifically preferable is a fluorine-substituted hydrocarbon group having a perfluoro group, such as a $CF_3(CF_2)a$-group or a $CF_3CF_3CF(CF_2)b$-group (a and b are an integer respectively) at one end of a molecular structure. Further, the length of the perfluoro group is preferably two or more in the number of carbons, and the number of $CF_2$ groups continuing to $CF_3$ in the $CF_3(CF_2)a$-group is appropriately 5 or more.

Further, the perfluoro group does not need to be a straight chain and may have a branch structure. In order to respond to environmental problems in recent years, preferable are structures, such as $CF_3(CF_2)c$-$(CH_2)d$-$(CF_2)e$-. In this case, c is 3 or less, d is an integer (preferably 1), and e is 4 or less.

The abovementioned fluorine mold releasing agent is usually a solid. However, in order to coat this agent on the surface of the master 10A, it is necessary to dissolve it in an organic solvent to prepare a solution. Although the kind of the solvent may become different depending on the molecular structure of a mold releasing agent, a fluorinated hydrocarbon type solvent or its mixed solvent with a slight amount of an organic solvent may be suitable as a solvent of many mold releasing agents. The concentration of the solvent is not specifically limited. However, since the required mold releasing layer is characterized to be thin specifically, a low concentration of 1 to 3 weight % may be sufficient.

In order to coat this solution onto the surface of the master 10A, usual coating methods, such as a dip coating, a spray coating, a brush coating, and a spin coat, may be employed. After coating, a solvent is evaporated from a coating layer usually by natural drying, whereby a dried coating film is formed. At this time, although the thickness of the dried coating film is not restricted specifically, a thickness of 20 μm or less is suitable.

Specific examples include OPTOOL DSX, DURASURF HD-1100, and DURASURF HD-2100 manufactured by Daikin Industries, NOVEC EGC1720 manufactured by Sumitomo 3M Limited, vapor deposition of triazine-thiol manufactured by Takeuchi Vacuum Deposition Co., Ltd., Amorphous fluorine CYTOP Grade M manufactured by AGC, and Antifouling coat OPC-800 manufactured by NI Material Co., Ltd.

(Mold Releasing Agent having a Hydrocarbon Group at its Functional Side)

The hydrocarbon group may be a straight chain type hydrocarbon group, such as $C_nH_{2n+1}$, or may be a branch type hydrocarbon group. A silicone type mold releasing agent is contained in this classification.

Conventionally, the mold releasing agent is a composition which includes an organopolysiloxane resin as a principal component, and many compositions are known as a composition which forms a hardened film exhibiting water repellence. For example, Japanese Unexamined Patent Publication No. 55-48245 proposes a composition which is composed of a hydroxyl group-containing methyopolysiloxane resin, α,ω-dihydroxydiorganopolysiloxan, and organosilane and is hardened to form a film excellent in mold-release characteristics and antifouling properties and exhibiting water repellence. Further, Japanese Unexamined Patent Publication No. 59-140280 proposes a composition which includes as a principal component a partial cohdrolysis condensation product of organosilane which includes perfluoro alkyl group-containing organosilane and amino group-containing organosilane as a principal component and forms a hardened film excellent in water repellence and oil repellence.

Specific examples include MOLDSPAT manufactured by AGC SEIMI CHEMICAL CO., LTD., OlgaChicks SIC-330, 434 manufactured by Matsumoto Fine Chemicals Co., Ltd., and SR-2410 manufactured by Toray Dow Chemical Co., Ltd. Further, SAMLAY manufactured by Nippon Soda may be employed as a self-organizing monomolecular film.

In the case where the resin 22A is a light hardening resin, a light source 50 arranged above the master 10A is made to turn on to emit light.

As such a light source 50, a high pressure mercury lamp, a metal halide lamp, a xenon lamp, a halogen lamp, a fluorescent lamp, a black light, a G lamp, a F lamp, etc. may be employed, and the light source 50 may be a line-shaped light source or may be a point-shaped light source. The high pressure mercury lamp is a lamp having a narrow spectrum in 365 nm and 436 nm. The metal halide lamp is one kind of a mercury-vapor lamp, and its output in an ultraviolet region is several times higher than that of the high pressure mercury lamp. The xenon lamp is a lamp with a spectrum nearest to sunlight. The halogen lamp contains a lot of light with long wavelengths and is a lamp emitting light being almost near-infrared light. The fluorescent lamp has equal exposure intensity for each of three primary colors of light. The black light is a light which has a peak top in 351 nm and emits near-ultraviolet light (300 nm to 400 nm).

In the case of irradiating light from the light source 50, plural line-shaped or spot-shaped light sources 50 are arranged in the form of a lattice such that light beams reach at once the whole surface of the resin 22A, or a line-shaped or spot-shaped light source 50 is made to scan in parallel to the surface of the resin 22A such that light beams reach the resin 22A sequentially. In this case, preferably, luminance distribution or illumination (intensity) distribution is measured at the time of irradiating light, and then the number of irradiating times, an amount of irradiation, and irradiation time are controlled based on the measurement results.

After the resin 22A has been hardened with light (after a sub master 20 has been produced), the sub master 20 may be subjected to a post cure (a heat treatment). If the post cure is performed, the resin 22A of the sub master 20 can be hardened thoroughly, and the die service life of the sub master 20 can be prolonged. Herein, an example of the hardening of the sub master mold. However, naturally without saying, the post cure can be applied also to a case of molding and hardening a resin forming an optical configuration. In this case, if a heating process is conducted on the condition that a resin is filled up between a mold and a base board and the mold is not separated, both the transfer ability of the mold and the releasing ability from the mold can be improved.

It may be preferable that in the heating process, a heating temperature is changed in plural steps in such a way that the heating temperature in the first step is set at a low temperature and the heating temperature in the second step is set at a higher temperature than that in the first step, whereby the transfer ability from the mold to the resin can be improved in the first step and the releasing ability of the resin from the mold can be improved in the second step.

In this case, the temperature in the first step is preferably 70 to 90° C. and the temperature in the second step is preferably 100 to 250° C.

Further, the heating process may be conducted after the resin has been released from the mold. In this case, the heating process may be conducted separately before and after the mold releasing process in such a way that the first heating process is conducted before the releasing of the mold and the second heating process is conducted after the releasing of the mold. Specifically, in the case that a lens is molded from a mold (in this example, a sub master mold), a time period occupying the mold can be shop tuned by this method. Whereby a cycle time becomes short and a productivity can be improved.

Here, the first heating process before the releasing of the mold and the second heating process after the releasing of the mold may be conducted such that the temperature may be changed from low to high or from high to low as stated above in relation to the abovementioned cycle time.

In the case where the resin 22A is a thermo-hardening resin, the resin 22A is heated while a heating temperature and heating time are controlled in respective optimal ranges. The resin 22A can be shaped also by methods, such as injection molding, press forming, cooling after light irradiation.

Figure 3B:
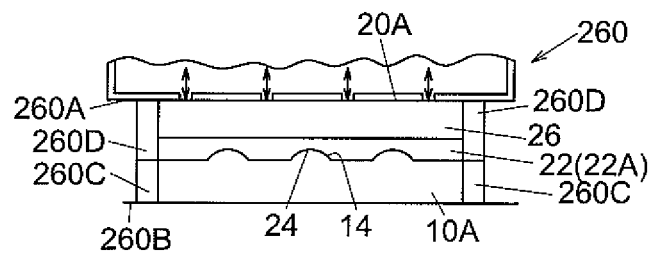

As shown in FIG. 3(b), the sub master molding section 22 is lined such that the sub master base board 26 is mounted onto the rear surface (a surface opposite to the concave portions 24) of the sub master molding section 22 (resin 22A).

The sub master base board 26 may be quartz, or may be a glass plate, and it is important for the sub master base board 26 to have sufficient bending strength and UV transmittance. In order to enhance the adhesiveness between the sub master molding section 22 and the sub master base board 26, a process to coat a silane coupling agent may be conducted onto the sub master base board 26.

Here, after the convex portions 14 of the master 10A have been transferred onto a resin 22A and the resin 22A has been hardened (that is, after the sub maser forming section 22 has been formed), when a sub master base board 26 is mounted on the sub maser forming section 22 (the lining is conducted at a room temperature), an adhesive is used.

On the contrary, the convex portions 14 of the master 10A has been transferred to the resin 22A, and then before the resin 22A is hardened, the sub master base board 26 may be mounted on the sub maser forming section 22. In this case, without employing an adhesive, the sub master base board 26 is made to stick to the resin 22A by the adhesion force of the resin 22A, or a coupling agent is coated onto the sub master base board so as to enhance the adhesion force of the sub master base board and the sub master base board is made to stick to the resin 22A by the enhanced adhesion force of the sub master base board 26. As a method of lining with the sub master base board 26 and hardening, for example, employable is a method in which a thermo-hardening resin is used as the resin 22A and, on the condition that the resin 22A is filled up between the master 10A and the sub master base board 26, these components are put in a baking furnace, and a method in which a UV transmissive base board is used as the sub master base board 26 and, on the condition that the resin 22A is filled up between the master 10A and the sub master base board 26, UV light is irradiated to the resin 22A from the sub master base board 26 side.

Further, when the sub master molding section 22 (resin 22A) is lined with the sub master base board 26, a conventionally-known vacuum chuck device 260 may be used desirably in the following ways. The sub master base board 26 is sucked and held on a sucking surface 260A of this vacuum chuck device 260. Then, the sucking surface 260A is made to a condition parallel to the forming surface of the convex portions 14 on the master 10A, and the sub master molding section 22 is lined with the sub master base board 26. With this, a reverse face 20A (a surface at the sub master base board 26 side) of the sub master 20 becomes parallel to the forming surface of the convex portions 14 on the master 10A, and a forming surface of the concave portions 24 on the sub master 20 becomes parallel to the reverse surface 20A. Accordingly, as mentioned later, when lens sections 5 are molded by the sub master, since a reference surface of the sub master 20, that is, the reverse surface 20A can be made parallel to the forming surface of the concave portions 24, it is possible to prevent the lens sections 5 from causing decentering and having dispersion in thickness, whereby the profile accuracy of the lens sections 5 can be improved so that a lens performance can be maintained at high level. Further, since the sub master 20 is sucked and held by the vacuum chuck device 260, the sub master 20 can be attached or detached by only the operation for ON and OFF of evacuation. Therefore, the sub master 20 can be arranged easily. Further, when the master 10A is sucked and held by a second vacuum chuck device arranged to be parallel to the sucking surface 260A of the vacuum chuck device 260, in the operation required with the most careful attention in releasing the hardened sub master 20 from the master 10A, if the vacuum chuck is made OFF on the condition that the both components are hardened in close contact with each other, it becomes possible to release easily from the molding device. Therefore, the releasing operation can be conducted surely on a wide environment with less device restriction or on a separate device. Further, during this operation, if another master and sub master are attached to the molding device with the vacuum chuck, the molding of the sub master can be conducted continuously.

Here, the definition "the reverse surface 20A is parallel to the forming surface of the concave portions 24" means specifically that the reverse surface 20A is vertical to a central axis on the forming surface of the concave portions 24.

Furthermore, the sucking surface 260A of the vacuum chuck device 260 is preferably made from a ceramic material. In this case, since the hardness of the sucking surface 260A becomes high, the sucking surface 260A hardly becomes damaged due to attachment and detachment of the sub master 20 (the sub master base board 26). Accordingly, the high surface accuracy of the sucking surface 260A can be maintained. As such a ceramic material, silicon nitride, sialon or the like may be preferably employed. In this case, since the linear expansion coefficient of the above materials is as small as $13 \times 10^{-6}$ [/K], the high flatness of the sucking surface 260A can be maintained for temperature fluctuation.

Here, if a surface of a sub master 20 to which the sub master base board is lined, is made a flat surface, the molding is conducted in a vacuum by holding the glass base board or the sub master base board with electrostatic chuck.

In the present embodiments, as a method of making the sucking surface 260A to a condition parallel to the forming surface of the convex portions 14 on the master 10A, the following methods are employed.

First, the obverse and reverse surfaces of the master 10A are made parallel with high precision. With this, on the master 10A, the forming surface of the convex portions 14 and the reverse surface are made parallel to each other.

Further, reference members 260C and 260D are provided so as to protrude on a supporting surface 260B to support the master 10A from the reverse surface (a surface opposite to the convex portions 14) side and the sucking surface 260A, respectively. Here, the configuration of these reference members 260C and 260D is made into a configuration with which these reference members 260C and 260D come in contact with each other without play when the master 10A and the sub master 20 come in contact with each other on a condition that the supporting surface 260B and the sucking surface 260A are parallel to each other.

With this configuration, when the reference member 260C and 260D are made to come in contact with each other, the supporting surface 260B of the master 10A, further, the forming surface of the convex portions 14 on the master 10A are made parallel to the sucking surface 260A.

Incidentally, in the above methods, the reference member may be provided to at least one of the supporting surface 260B and the sucking surface 260A. For example, in the case where the reference member is provided to only the supporting surface 206B, the configuration of the reference member may be made into a configuration with which the reference member comes in contact with the sucking surface 260A without play when the master 10A and the sub master 20 come in contact with each other on a condition that the supporting surface 260B and the sucking surface 260A are parallel to each other. Similarly, in the case where the reference member is provided to only the sucking surface 260A, the configuration of the reference member may be made into a configuration with which the reference member comes in contact with the supporting surface 260B without play when the master 10A and the sub master 20 come in contact with each other on a condition that the supporting surface 260B and the sucking surface 260A are parallel to each other. The parallelism by such a mechanical contact may be realized with a reproducibility of about several second angles without a special alignment device.

Figure 3C:
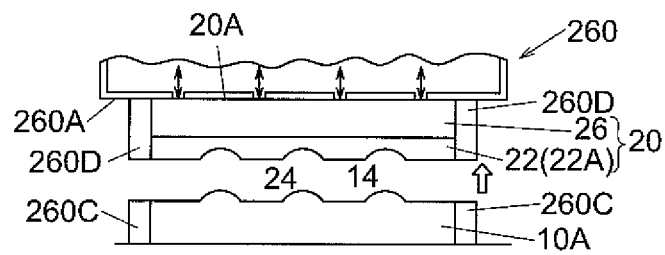

As shown in FIG. 3(c), when the sub master molding section 22 and the sub master base board 26 are released from the master 10A, the sub master 20 is formed.

When a resin, such as PDMS (poly dimethyl siloxane), is used as the resin 22A, the resin has excellent mold-release characteristics for the master 10. Accordingly, it is desirable, because large force is not required for peeling the resin from the master 10 and there is no possibility that a molded optical surface is made distorted.

Figure 3D:
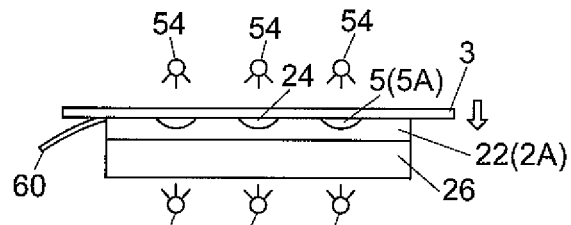

As shown in FIG. 3(d), the resin 5A is filled between the sub master 20 and a glass base board 3 and then hardened. In more detail, the resin 5A is filled up for the concave portions 24 of the sub master 20, and the resin 5A is hardened while being pressed with a glass base board 3 from its upper side.

When the resin 5A is filled up for the concave portions 24 of the sub master 20, the resin 5A is coated on the sub master 20 by coating methods, such as a spray coating, a spin coating or the like. In this case, the resin 5A may be coated while being vacuumed. If the resin 5A is coated while being vacuumed, the resin 5A can be hardened without being mixed with air bubbles.

In place of the process of filling the resin 5A into the concave portions 24 of the sub master 20, the resin 5A may be filled in such a way that the resin 5A is coated on the glass base board 3, and then the glass base board 3 coated with the resin 5A is pressed onto the sub master 20.

At the time of pressing the glass base board 3, it may be preferable to provide a structure to align the glass base board 3 and the he sub master 20. When the glass base board 3 is shaped in a circular form, for example, it is preferable to form a D cut, an I cut, a marking, a notch, or the like. The glass base board 3 may be shaped in a polygonal form, and in this case, an alignment between it and the sub master 20 may be conducted easily. Further, a marker pattern used for aligning an axis with the same axis of the molded optical surface on the obverse surface side at the time of molding the reverse surface of the glass base board 3 may be molded and transferred simultaneously with the optical surface at the time of molding the obverse surface side.

Incidentally, at the time of pressing the sub master 20 onto the base board 3, a gap between a flat portion which connects among concave portions being molding sections of the sub master 20 and the glass base board 3 determines the thickness of a remaining film due to a spread-out resin of a resin filled up later. Such a remaining film is not preferable, because there is fear that the remaining film shrinks into an in-plane direction of the base board at the time of hardening and causes dimension errors.

Therefore, such a gap between the flat portion and the glass base board is made preferably 100 μm or less, more preferably 50 μm or less.

In the case of hardening the resin 5A, the resin 5A may be irradiated from the sub master 20 side with light emitted from a light source 52 arranged below the sub master 20, or may be irradiated from the glass base board 3 side with light emitted from a light source 54 arranged above the glass base board 3, or may be irradiated from the both the sub master 20 side and the glass base board 3 side with light emitted from both the light source 52 and the light source 54.

As the light sources 52 and 54, as with the above mentioned light source 50, a high pressure mercury lamp, a metal halide lamp, a xenon lamp, a halogen lamp, a fluorescent lamp, a black light, a G lamp, a F lamp, etc. may be employed, and the light source 50 may be a line-shaped light source or may be a point-shaped light source.

In the case of irradiating light from the light sources 52 and 54, plural line-shaped or spot-shaped light sources 50 are arranged in the form of a lattice such that light beams reach at once the resin 5A, or a line-shaped or spot-shaped light source 50 is made to scan in parallel to the sub master 20 and the glass base board 3 such that light beams reach the resin 5A sequentially. In this case, preferably, luminance distribution or illumination (intensity) distribution is measured at the time of irradiating light, and then the number of irradiating times, an amount of irradiation, and irradiation time are controlled based on the measurement results.

When the resin 5A is hardened, the lens sections 5 are formed. Thereafter, when the lens sections 5 and the glass base board 3 are released from the sub master 20, a wafer lens 1 is formed (in the wafer lens 1, the lens sections 5 are fanned on only the surface of the glass base board 3).

In the case where the wafer lens 1 is released from the sub master 20, a pulling margin 60 is provided beforehand between the wafer lens 1 (glass base board 3) and the sub master 20 in such a way that when the pulling margin 60 is pulled, the wafer lens 1 may be released from the sub master 20.

If the sub master base board 26 of the sub master 20 is made of an elastic material (resin), the wafer lens 1 may be released from the sub master 20 while the sub master base board 26 is slightly bent. Alternately, if the glass base board 3 is made of an elastic material (resin) instead of glass, the wafer lens 1 may be released from the sub master 20 while this base board made of the elastic material is slightly bent.

Further, when the wafer lens 1 is released slightly from the sub master 20 such that a gap is formed between two components, air or purified water into is fed with pressure to the gap so that the wafer lens 1 may be released from the sub master 20.

Here, in the above description, a method to provide the lens sections 5 on one side of the glass base board 3 was explained. However, in the case where the lens sections 5 are formed on both sides of the glass base board 3, firstly, prepared are a master (not shown) provided with a plurality of forming surfaces with a positive configuration corresponding to an optical surface configuration of the lens sections 5 to be formed on one side of the glass substrate 3 and another master provided with a plurality of forming surfaces with a positive configuration corresponding to an optical surface configuration of the lens sections 5 to be formed on another side of the glass substrate 3. Then, sub masters 20C and 20D are formed by the use of these masters (refer to FIGS. 3(e) and 3(f). With this, the sub master 20C has forming surfaces with a negative configuration corresponding to an optical surface configuration of the lens sections 5 to be formed on one side of the glass substrate 3, and the sub master 20D has forming surfaces with a negative configuration corresponding to an optical surface configuration of the lens sections 5 to be formed on another side of the glass substrate 3. Further, the resin 5A is filled up between the glass base board 3 and each of the sub master 20C and 20C, and then the resin 5A is hardened, whereby the lens sections 5 are formed on both sides of the glass base board 3. According to this method, the resin 5A is hardened and shrinks simultaneously on both sides of the glass base board 3 to become the lens sections respectively without being hardened and shrinking only on one side of the glass base board 3. Accordingly, different from the case where the lens sections 5 are provided on each side sequentially, since this method can prevent the glass base board 3 from causing warp, the shape accuracy of the lens sections 5 can be improved. Here, the expression that resins 5A at both surfaces are hardened simultaneously means that the resins 5A are hardened completely in the same hardening process. Therefore, it is not necessary to start and finish the hardening simultaneously.

For example, it may be permissible that after the viscosity of a resin 5A between the sub master 20C and the glass base board 3 is increased to a predetermined viscosity, this resin 5a and another resin 5a are hardened completely.

Here, in order to fill up the resin 5A between the glass base board 3 and each of the sub masters 20C and 20D, the following two methods can be employed.

Figure 3E:
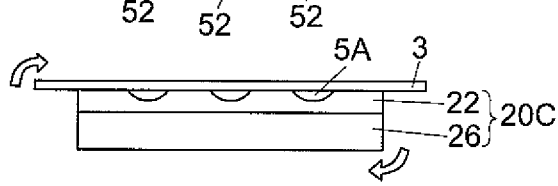
Figure 3F:
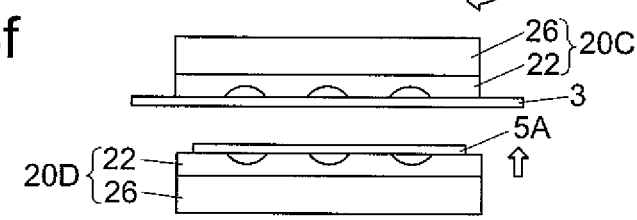

In the first method, as shown in FIGS. 3(e) and 3(f), resin 5A is dropped or discharged on the top surface of the sub master 20C, and then the sub master 20C is brought in contact with the glass base board 3 arranged above the sub master 20C so as to become a condition that the resin 5A is filled up between the glass base board 3 and the sub master 20C. Thereafter, the top and bottom of the one body of the glass base board 3 and the sub master 20C coming in contact with each other are reversed. Next, another resin 5A is dropped or discharged on the top surface of the sub master 20D, and then the sub master 20D is brought in contact with the glass base board 3 arranged above the sub master 20D so as to become a condition that the resin 5A is filled up between the glass base board 3 and the sub master 20D.

In the second method, resin 5A is dropped or discharged on the top surface of the glass base board 3, and then the glass base board 3 is brought in contact with the sub master 20C arranged above the glass base board 3 so as to become a condition that the resin 5A is filled up between the glass base board 3 and the sub master 20C. Next, another resin 5A is dropped or discharged on the top surface of the sub master 20D, and then the sub master 20D is brought in contact with the glass base board 3 arranged above the sub master 20D so as to become a condition that the resin 5A is filled up between the glass base board 3 and the sub master 20D.

In the third method, the hardening is conducted sequentially for optical surfaces one side by one side of the glass base board 3. However, in order to prevent warp due to hardening and shrinking, the initially molded surface is not released from the mold until the molding and hardening of the both surfaces are completed. Therefore, after the resin 5A filled in the sub master 20C in the initial hardening and molding has been hardened, the reverse surface is molded by the use of sub master 20D while the hardened the resin 5A comes in contact with the sub master 20C. Although the glass base board 3 receives a pulling force toward the molded surface side due to the hardening and shrinking of the resin 5A in the molding with the sub master 20C, the sub master 20C receives this force while coming in contact with the resin 5A, thereby preventing such warp. On this condition, when a resin 5A is filled into the reverse surface and molded and hardened by the use of the sub master 20D, the above pulling force balances with a pulling force due to the hardening and shrinking of the resin 5A on this side, whereby warp of the glass baseboard can be prevented even if the sub masters 20C and 20D are released.

When the glass base board 3 and the sub masters 20C and 20D are brought in contact with each other, it is desirable to prevent air bubbles from remaining between them. As such a resin 5A used in this embodiments, a thermo-hardening resin, a UV hardening resin, and a volatilization hardening resin (HSQ etc.) may be employed. In the case where the UV hardening resin is employed, if at least one of the sub masters 20C and 20D is made to have UV ray permeability, UV rays can be irradiated to resins 5A on both sides of the glass board 3 at one time from the at least one of the sub masters 20C and 20D.

Figure 7:
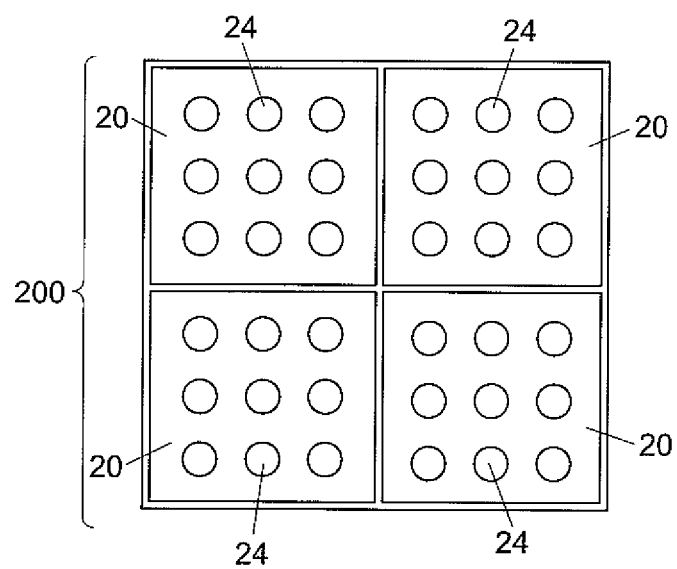
FIG. 7 is a plan view showing an outline structure of a large size sub master.
Figure 8:
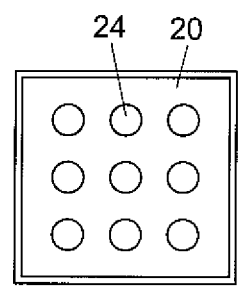
FIG. 8 is a plan view showing an outline structure of a normal size sub master.

In the case where the lens sections 5 are formed on the both obverse and reverse surfaces of the glass base board 3, it may be permissible to prepare an integral type large size sub master 200 made larger two times (the magnification can be changed) in both longitudinal and transverse directions than the sub master 20 as shown in FIG. 7 and an ordinary sub master 20 as shown in FIG. 8. Then, when the lens sections 5 are formed on the obverse side of the glass base board 3, the sub master 200 is used, and when the lens sections 5 are formed on the reverse side of the glass base board 3, the sub master 20 is used plural times.

Specifically, for the obverse surface of the glass base board 3, the lens sections 5 are formed collectively at one time by the use of the large size sub master 200. Thereafter, for the reverse surface of the glass base board 3, the lens sections 5 are formed by the use of the sub master 20 while the sub master 20 is shifted four times to four positions corresponding to the quarter divisions of the large size sub master 200 as shown in FIG. 9. According to this technique, it becomes easy to align the sub master 20 for the glass base board 3 on which the lens sections 5 are formed by the use of the large size sub master 200, whereby it becomes possible to avoid the situation that the arrangement of the lens sections 5 formed on the obverse surface of the glass base board 3 by the use of the large size sub master 200 is deviated from that of the lens sections 5 funned on the reverse surface of the glass base board 3 by the use of the sub master 20.

Figure 10:
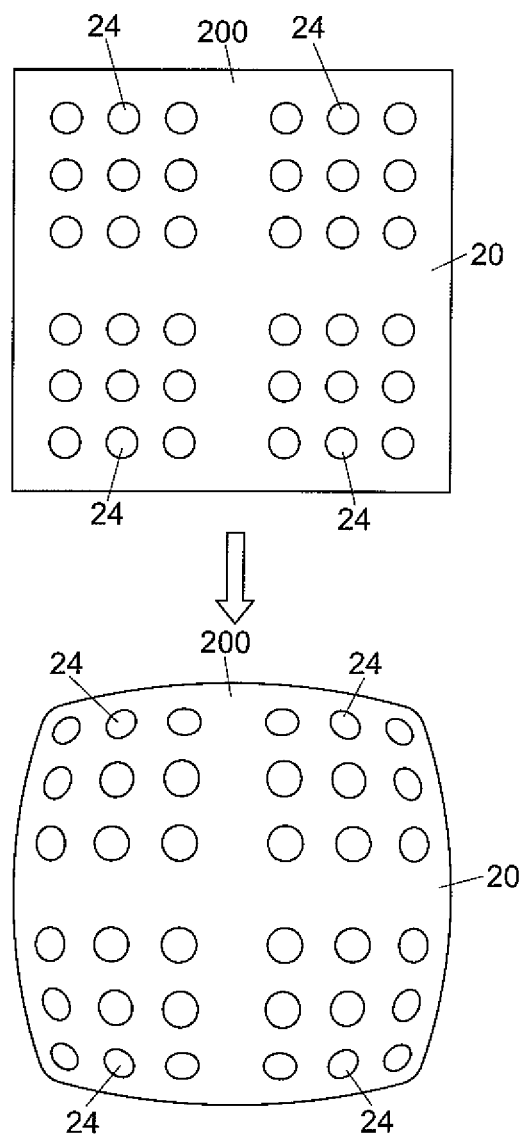
FIG. 10 is an illustration for explaining inconvenience at the time of using a large size sub master.
Figure 11:
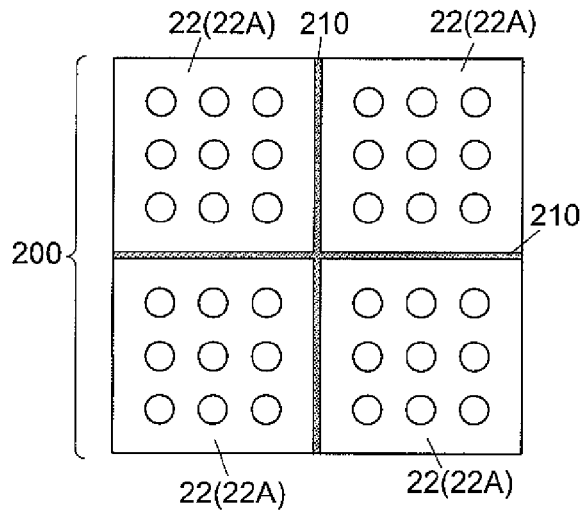
FIG. 11 is a drawing showing a modified example of a large size sub master.

However, in the case where the large size sub master 200 is used, as shown from the upper side to the lower side in FIG. 10, there may be a possibility that warp may take place slightly on the sub master molding section 22, and there may be a case that the sub master molding section 22 cannot exert the original function as a mold. Then, as shown in FIG. 11, it is preferable to provide a cross-shaped region (stress relaxing section 210), where resin 22A does not exist, in the center section so as to divide the large size sub master 200, whereby the large size sub master 200 is structured to prevent warp from taking place on the sub master molding section 22 (to relax the stress between the sub master molding section 22 and the glass base board 3). The stress relaxing section 210 may be a region where resin 22A does not exist as with this embodiment or a region where a resin layer is formed thinly. Further, the stress relaxing section 210 may be provided for every several lens forming sections and may be provided so as to surround each lens forming section. In the case where such a stress relaxing section 210 is provided, it becomes possible to prevent positional deviation in the surface direction due to shrinkage or the lowering of the shape accuracy in addition to prevent warp of the sub master 20.

When the stress relaxing section 210 is formed, for example, if the resin 22A is a light hardening resin, a non-irradiated section with light may be formed by the masking for the glass base board 3 or the sub master base board 26, or a non-irradiated section with light may be formed by the masking for light sources 52 and 54.

In addition, the master 10B may be used in place of the master 10A, and a wafer lens 1 may be produced directly from the master 10B without producing the sub master 20.

In this case, resin 5A is filled up into concave portions 16 of the master 10B and is hardened while being pressed with the glass base board 3 from its upper part, and thereafter, the glass base board 3 and the lens sections 5 are released from the master 10B. The hardening method for the resin 5A may be different depending on resin materials. However, for example, when a UV hardening resin is used, the resin is hardened by being irradiated with UV light from the glass base board 3 side. On the other hand, when a thermo-hardening resin is used, the resin is hardened by being heated with an infrared lamp or a heater embedded in the master 10B.

The mold releasing to release the resin 5A from the master 10B is important, and as the mold releasing method, two methods may be considered.

As the first method, a mold releasing agent is added to the resin 5A. In this case, in the post-processing, the adhesiveness of an antireflection coat to the resin 5A may be lowered, or the adhesiveness of the resin to the glass base board 3 may be lowered. Accordingly, a coupling agent and etc. are preferably coated to the glass base board 3 so as to strengthen the adhesive force.

As the second method, a mold releasing agent is coated on the surface of the master 10B. As the mold releasing agent, a mold releasing agent to form monomolecular layer, such as triazin dithiol, a fluorine type or silicon type, may be employable. If such a mold releasing agent is used, the mold releasing agent can be coated to a film forming thickness of about 10 nm which is a thickness not affecting an optical surface configuration. In order to increase adhesiveness of the mold releasing agent not to be peeled off at the time of molding, it may be preferable to coat a coupling agent onto the master 10B or to coat $SiO_2$ onto the master 10B to cause crosslinking between the mold releasing agent and the master 10B, whereby the adhesiveness becomes strong.

Second Embodiment

The second embodiment mainly differs in the following points from the first embodiment in respect of and is the same with the first embodiment except them.

In the manufacture of a wafer lens 1, a master 10, a sub master 30, and a sub-sub master 40 shown in FIG. 4 are used as a mold for molding. In the first embodiment, the sub master 20 is used to manufacture a wafer lens 1 from the master 10 (10B). However, in the second embodiment, as a point different from the first embodiment, two molds of a sub master 30 and a sub-sub master 40 are mainly used to manufacture a wafer lens 1 from the master 10 (10B). Particularly, although the process of producing the sub master 30 from the master 10B and the process of producing a wafer lens 1 from the sub-sub master 40 are almost same with the first embodiment, a point to produce the sub-sub master 40 from the sub master 30 is different from the first embodiment.

As shown in FIG. 4, the master 10B is a mold in which plural concave portions 16 are formed in an array form on a base portion 12 in the form of a rectangular parallelepiped shape. The configuration of each of the concave portions 16 is a negative configuration corresponding to each of the lens sections 5 of the wafer lens 1 and dents in an approximately hemisphere configuration in this drawing. The outer configuration of the master 10B does not need to be a square and may be a circle configuration. However, a square shape is explained as an example in this embodiment.

The master 10B may be produced such that materials, such as nickel phosphorus, an aluminum alloy, a free-cutting brass alloy, are subjected to a cutting process with a diamond cutting tool so as to form an optical surface with high accuracy, or high hardness materials, such as a super hard alloy are subjected to a grinding process. The optical surface is formed on the master 10B such that plural concave portions 16 may be arranged in an array form preferably as shown in FIG. 4, or only a single concave portion 16 may be arranged.

As shown in FIG. 4, the sub master 30 is constituted by a sub master molding section 32 and a sub master base board 36. In the sub master molding section 32, plural convex portions 34 are formed in an array form. The configuration of each of the convex portions 34 is a positive configuration corresponding to each of the lens sections 5 of the wafer lens 1 and protrudes in an approximately hemisphere configuration in this drawing. This sub master molding section 32 is made of a resin 32A.

As the resin 32A, basically the same materials as the resin 22A of the sub master 20 in the first embodiment may be employed. However, particularly, it is desirable to employ a resin having a mold-release characteristic, a heat resistance property, and a small linear expansion coefficient (namely, resin with small surface energy). Specifically, any one of the above-mentioned light hardening resin, thermo-hardening resin, and thermoplastic resin may be permissible, and, transparence or opaque may be permissible. However, if a thermo-hardening resin is used, it is necessary to use the above-mentioned fluorine type resin. The reason is that if a silicone type resin is used, since such a resin has a large linear expansion coefficient, the resin deforms when the resin is thermally transferred into the sub master 40 so that a microscopic structure cannot be transferred correctly.

The same material as that of the sub master base board 26 can be used for the sub master base board 36.

As shown in FIG. 4, the sub-sub master 40 is constituted by a sub-sub master molding section 42 and a sub-sub master base board 46. In the sub-sub master molding section 42, plural concave portions 44 are formed in an array form. The concave portions 44 are portions corresponding to the lens sections 5 of a wafer lens 1 and dents in an approximately hemisphere configuration. This sub-sub master molding section 42 is made of a resin 42A.

As the resin 42A, the same material as the resin 22A of the sub master 20 in the first embodiment may be employed. However, it is desirable to use a silicone type resin or an olefin type resin at a point that since such a resin can be bent, it is easy to release the resin from a mold.

The same material as that of the sub master base board 26 can be used for the sub-sub master base board 46.

Next, the producing method of a wafer lens 1 is explained briefly with reference to FIG. 5 and FIG. 6.

Figure 5A:
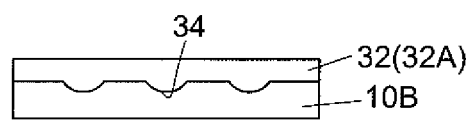
FIGS. 5a-5e are illustrations for explaining a producing method of a wafer lens.

As shown in FIG. 5(a), the resin 32A is coated on the master 10B, the resin 32A is hardened, the concave portions 16 of the master 10B are transferred to the resin 32A so that plural convex portions 34 are formed on the resin 32A. With this, the sub master molding section 32 is formed.

Figure 5B:
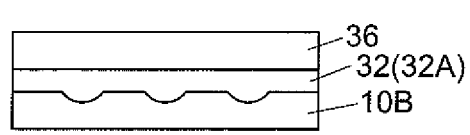

As shown in FIG. 5(b), the sub master base board 36 is pasted up onto the sub master molding section 32.

Figure 5C:
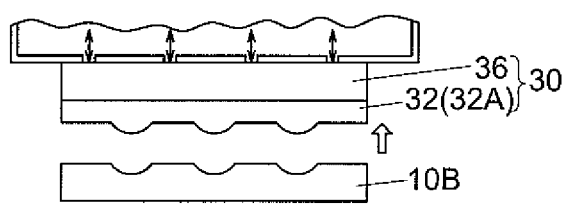

Then, as shown in FIG. 5(c), the sub master molding section 32 and the sub master base board 36 are released from the master 10B, whereby the sub master 30 is produced.

Figure 5D:
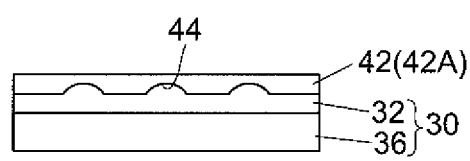

Thereafter, as shown in FIG. 5(d), the resin 42A is coated on the sub master 30, the resin 42A is hardened, the convex portions 34 of the sub master 30 are transferred onto the resin 42A so that plural concave portions 44 are formed on the resin 42A. With this, the sub-sub master molding section 42 is formed.

Figure 5E:
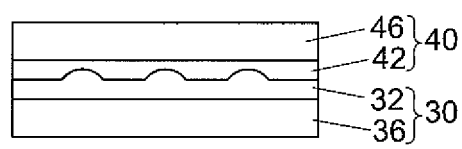

Then, as shown in FIG. 5(e), the sub-sub master base board 46 is mounted on the sub-sub master molding section 42.

Figure 6F:
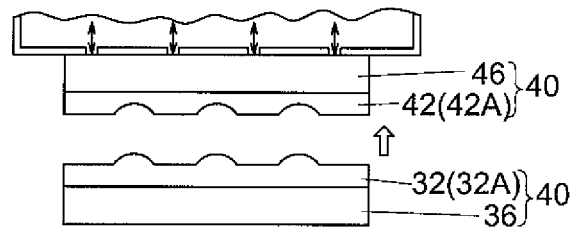
FIGS. 6f and 6g are illustrations for explaining the producing method continued to that of FIG. 5.

As shown in FIG. 6(f), the sub-sub master molding section 42 and the sub-sub master base board 46 are released from the sub master 30, whereby the sub-sub master 40 is produced.

Figure 6G:
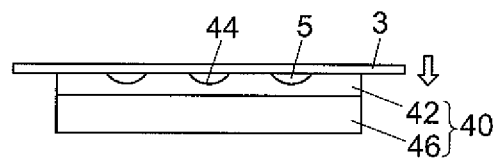

As shown in FIG. 6(g), the resin 5A is filled up in the concave portions 44 of the sub-sub master 40, and resin 5A is hardened while being pressed with the glass base board 3 from its upper part. As a result, the lens sections 5 are formed by the resin 5A. Thereafter, the lens section 5 and the glass base board 3 are released from the sub-sub master 40, whereby a wafer lens 1 is manufactured (in the wafer lens 1, the lens sections 5 are formed only on the surface of the glass base board 3.).

In the case where the lens sections 5 are also formed on the reverse surface of the glass base board 3 such that the lens sections 5 are formed on the both obverse and reverse surfaces of the glass base board 3, a master (not shown) provided with a plurality of forming surfaces with a negative configuration corresponding to an optical surface configuration of the lens sections 5 to be formed on one side of the glass substrate 3 and another master provided with a plurality of forming surfaces with a negative configuration corresponding to an optical surface configuration of the lens sections 5 to be formed on another side of the glass substrate 3 are prepared. Then, by the use of these masters, sub masters with a plurality of forming surfaces with a positive configuration are produced, and further, by the use of these sub masters, sub-sub masters are produced. Thereafter, the resin 5A is filled up between the glass base board 3 and each of the sub-sub masters, and the resin 5a is hardened, whereby the lens sections 5 are formed on the both surfaces of the glass base board 3.

The invention claimed is:

1. A production method of a wafer lens in which an optical member made of a first hardening resin are provided on both surfaces of a base board, comprising:
   a process of forming a first duplication molding section made of a second hardening resin and having a plurality of molding surfaces with a negative configuration corresponding to an optical surface configuration from a first mold having a plurality of molding surfaces with a positive configuration corresponding to the optical surface configuration of the optical member provided on one surface of the base board, and lining the first duplication molding section with a base board for the first duplication molding section, thereby forming a first duplication mold;
   a process of forming a second duplication molding section made of the second hardening resin and having a plurality of molding surfaces with a negative configuration corresponding to an optical surface configuration from a second mold having a plurality of molding surfaces with a positive configuration corresponding to the optical surface of the optical member provided on another surface of the base board, and lining the second duplication molding section with a base board for the second duplication molding section, thereby forming a second duplication mold;
   a first filling process of filling the first hardening resin between the first duplication mold and the one surface of the base board;
   a second filling process of filling the first hardening resin between the second duplication mold and the another surface of the base board after the viscosity of the first hardening resin filled between the first duplication mold and the one surface of the base board has been increased to a predetermined viscosity; and
   a hardening process of hardening the first hardening resins filled in the respective surfaces of the base board after the first and second filling processes;
   wherein the hardening process conducted for the one surface and the another surface of the base board includes a light hardening process to advance hardening by irradiating light to the filled first hardening resin and a heat hardening process to conduct a heating process to the first hardening resin whose hardening has been advanced by the light hardening process so as to advance further the hardening of the first hardening resin, and the first resin filled between the first duplication mold and the one surface of the base board and the first resin filled between the second duplication mold and the another surface of the base board are hardened simultaneously.

2. The production method of a wafer lens described in claim 1, wherein the heat hardening process is conducted so as to heat the first hardening resin on a condition that the first hardening resin is filled between the first or second duplication molding section and the base board where the light hardening process has been conducted, and the production method further comprises a mold releasing process to release the first hardening resin whose hardening has been advanced by the heat hardening process, from the duplication mold.

3. The production method of a wafer lens described in claim 2, further comprising a second heat hardening process to advance hardening by heating the released first hardening resin after the mold releasing process, and a heating temperature during the heat hardening process is lower than that during the second heat hardening process.

4. The production method of a wafer lens described in claim 3, wherein the heat hardening process is conducted at a heating temperature within a range of 70 to 90° C. and the second heat hardening process is conducted at a heating temperature within a range of 100 to 250° C.

5. The production method of a wafer lens described in claim 1, wherein the heat hardening process includes a first stage at which hardening is advanced with heating at a first heating temperature and a second stage at which hardening is advanced with heating at a heating temperature higher than the first heating temperature.

6. The production method of a wafer lens described in claim 1, wherein the base board is made of glass, the base boards for the first or second duplication molding section is made of glass, and a difference between the linear expansion coefficient of the glass of the base board and the linear expansion coefficient of the glass of the base boards for the first or second duplication molding section is $3\times10^{-5}$ [/K] or less.

7. The production method of a wafer lens described in claim 1, wherein the first or second duplication mold has a flat portion among the plurality of molding surfaces, and a distance between the flat portion of the first or second duplication mold and the base board at the time of the first or second filling process is maintained at 100 μm or less.

8. The production method of a wafer lens described in claim 1, wherein in the first filling process, after the first hardening resin is dropped or discharged on an upper surface of the base board, the first duplication mold arranged above the base board is brought in contact with the base board so as to make a condition that the first hardening resin is filled up between the base board and the first duplication mold, and in the second filling process, after the first hardening resin is dropped or discharged on an upper surface of the second duplication mold, the base board arranged above the second duplication mold is brought in contact with the second duplication mold so as to make a condition that the first hardening resin is filled up between the base board and the second duplication mold.

9. The production method of a wafer lens described in claim 1, wherein in the first filling process, after the first hardening resin is dropped or discharged on an upper surface of the first duplication mold, the base board arranged above the first duplication mold is brought in contact with the first duplication mold so as to fill up the first hardening resin between the base board and the first duplication mold, thereafter, the top of the base board and the bottom of the first duplication mold is reversed as one body on the condition that the base board and the first duplication mold come in contact with each other, and then, in the second filling process, after the first hardening resin is dropped or discharged on an upper surface of the second duplication mold, the base board arranged above the second duplication mold is brought in contact with the second duplication mold so as to fill up the first hardening resin between the base board and the second duplication mold.

10. The production method of a wafer lens described in claim 1, wherein a region where the second hardening resin does not exist is provided to a part of the molding surfaces of the first or second duplication mold in order to relax stress.

* * * * *